US012703577B2

(12) United States Patent
Tsujimoto

(10) Patent No.: US 12,703,577 B2
(45) Date of Patent: Aug. 11, 2026

(54) CONVEYED ARTICLE POSTURE ADJUSTMENT DEVICE

(71) Applicant: Daifuku Co., Ltd., Osaka (JP)

(72) Inventor: Kazushi Tsujimoto, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 277 days.

(21) Appl. No.: 18/709,272

(22) PCT Filed: Mar. 25, 2022

(86) PCT No.: PCT/JP2022/014493
§ 371 (c)(1),
(2) Date: Nov. 14, 2024

(87) PCT Pub. No.: WO2023/084808
PCT Pub. Date: May 19, 2023

(65) Prior Publication Data

US 2025/0197129 A1 Jun. 19, 2025

(30) Foreign Application Priority Data

Nov. 11, 2021 (JP) ................................ 2021-184252

(51) Int. Cl.
*B65G 47/244* (2006.01)
*B65G 43/08* (2006.01)
*B65G 47/28* (2006.01)

(52) U.S. Cl.
CPC ........... *B65G 47/244* (2013.01); *B65G 43/08* (2013.01); *B65G 47/28* (2013.01); *B65G 2203/0225* (2013.01); *B65G 2203/042* (2013.01)

(58) Field of Classification Search
CPC ...... B65G 47/244; B65G 43/08; B65G 47/28; B65G 2203/0225; B65G 2203/042
USPC .................................................... 198/457.01
See application file for complete search history.

(56) References Cited

U.S. PATENT DOCUMENTS 6,609,607 B2 * 8/2003 Woltjer .................. B65G 47/71 198/457.03
7,055,672 B2 * 6/2006 Holmgren ............ B65G 47/244 198/457.06
8,997,970 B2 * 4/2015 Ehmer ................... B65G 47/66 198/457.06

FOREIGN PATENT DOCUMENTS

DE 20307857 U1 11/2003
JP 2003531789 A 10/2003

* cited by examiner

*Primary Examiner* — Gene O Crawford
*Assistant Examiner* — Lester Rushin, III
(74) *Attorney, Agent, or Firm* — The Webb Law Firm

(57) ABSTRACT

In first control, a controller controls the swing angle of a first arm to cause the first arm to come in contact with a conveyed article, controls the swing angle of a second arm to cause the second arm to come in contact with the conveyed article, controls a first adjuster to apply an acceleration force to the conveyed article, and controls a second adjuster to apply a deceleration force to the conveyed article. In second control, the controller controls the swing angle of the first arm to cause the first arm to come in contact with the conveyed article, controls the swing angle of the second arm to cause the second arm to come in contact with the conveyed article, controls the first adjuster to apply a deceleration force to the conveyed article, and controls the second adjuster to apply an acceleration force to the conveyed article.

10 Claims, 6 Drawing Sheets

T1
T
T2
Z1(Z)
1
2
2a
93(90)
92(90)
91(90)
90a
10
20
30
40
11
11a
11b
11c
12a
(12)
16a
(16)
18
19
21
21a
21b
21c
22a
(22)
26a
(26)
28
29
31
31a
31b
31c
32a
(32)
36a
(36)
38
39
41
41a
41b
41c
42a
(42)
46a
(46)
48
49
A1
A2
A3
A4
60
61
62
63
64
WL
W
WR

10
T
T1
T2
Z1(Z)
A1
A3
30
11
(P1)
11
(Q1)
31
(P3)
31
(Q3)
92
(90)
90a
θ
①
③
32a
WL
12a
V1
V3
2
W
V2
V4
C
WR
22a
42a
②
④
21
(Q2)
41
(Q4)
62
A2
21
(P2)
A4
41
(P4)
64
63
20
40

10
T
T1
T2
Z1(Z)
A1
A3
30
11
(P1)
11
(Q1)
31
(P3)
31
(Q3)
92
(90)
90a
θ
②
④
WL
2
V1
V3
W
2
V4
C
WR
V2
①
③
21
(Q2)
41
(Q4)
62
A2
21
(P2)
A4
41
(P4)
64
63
20
40

10
T
T1
T2
Z1(Z)
A1
11
(P1)
11
(Q1)
A3
31
(P3)
30
92
(90)
90a
θ
32a
WL
12a
2
2
W
WR
22a
θ
42a
21
(Q2)
21
(P2)
A2
A4
41
(P4)
40
62
63
64
20

10
T
T1
T2
Z1(Z)
A1
11
(P1)
A3
31
(P3)
31
(Q3)
30
92
(90)
90a
12a
32a
θ
WL
11
(Q1)
2
W
2
WR
21
(Q2)
22a
42a
θ
41
(Q4)
62
A2
21
(P2)
63
A4
41
(P4)
64
20
40

10 T T1 T2 Z1(Z) A1 A3 30 92 (90) 11 (P1) 11 (Q1) 31 (P3) 31 (Q3) 90a θ 32a WL 2 12a W WR 22a 42a 21 (Q2) 41 (Q4) 62 A2 21 (P2) 63 A4 41 (P4) 40 64 20

CONVEYED ARTICLE POSTURE ADJUSTMENT DEVICE

CROSS-REFERENCE TO RELATED APPLICATIONS

This application is the United States national phase of International Patent Application No. PCT/JP2022/014493 filed Mar. 25, 2022, and claims priority to Japanese Patent Application No. 2021-184252 filed Nov. 11, 2021, the disclosures of which are hereby incorporated by reference in their entireties.

BACKGROUND OF THE INVENTION

Field of the Invention

The present invention relates to a conveyed article posture adjustment device for a conveyor that transports, in a predetermined transport direction, a conveyed article on a placement surface from upstream to downstream in the transport direction.

Description of Related Art

Japanese Unexamined Patent Application Publication (Translation of PCT Application) No. 2003-531789 (Patent Literature 1) describes a side-by-side eliminating conveyor that separates conveyed articles moving side by side along the conveyor and aligns the orientations of the conveyed articles in a singular and linear manner. In the background described hereafter, reference signs in parentheses are the reference signs in Patent Literature 1. The side-by-side eliminating conveyor (114) shown in FIG. 12 in Patent Literature 1 includes a pair of redirecting members (168, 170), with one redirecting member (170) located downstream from the other redirecting member (168) in a transport direction. The pair of redirecting members (168, 170) continuously redirect the conveyed articles when the conveyed articles are transported.

Patent Literature 1: Japanese Unexamined Patent Application Publication (Translation of PCT Application) No. 2003-531789 (paragraphs 0014 and 0058)

The side-by-side eliminating conveyor shown in FIG. 12 in Patent Literature 1 can substantially separate the side-by-side conveyed articles and align the conveyed articles in the transport direction on the conveyor. However, as described in paragraph 0057 in Patent Literature 1, the conveyed articles being redirected by the redirecting members rotate or slide when the conveyed articles hit the redirecting members. Such a technique for simply causing the conveyed articles to hit the redirecting members cannot easily adjust the posture of the conveyed articles being transported on the conveyor.

SUMMARY OF THE INVENTION

In view of the foregoing, techniques are thus awaited for easily adjusting the posture of a conveyed article being transported on a conveyor.

A conveyed article posture adjustment device according to an aspect of the disclosure is a device for a conveyor to transport, in a predetermined transport direction, a conveyed article on a placement surface from upstream to downstream in the transport direction. The device includes a first adjustment device, a second adjustment device, and a controller. The first adjustment device includes a first arm located above the placement surface and on a left to a transportation center line in a width direction perpendicular to the transport direction as viewed in a vertical direction. The left in the width direction is a left as viewed downstream in the transport direction. The transportation center line is an imaginary line passing through a center portion of the placement surface in the width direction and extending in the transport direction. The first adjustment device includes a first swing unit that swings the first arm about a first swing axis extending in the vertical direction, and a first adjuster supported by the first arm to apply a force to the conveyed article in contact with the first arm. The second adjustment device includes a second arm located above the placement surface and on a right to the transportation center line in the width direction. The right in the width direction is a right as viewed downstream in the transport direction. The second adjustment device includes a second swing unit that swings the second arm about a second swing axis extending in the vertical direction, and a second adjuster supported by the second arm to apply a force to the conveyed article in contact with the second arm. The controller performs first control to rotate the conveyed article clockwise in a plan view and perform second control to rotate the conveyed article counterclockwise in a plan view. In the first control, the controller controls a swing angle of the first arm to cause the first arm to come in contact with the conveyed article, controls a swing angle of the second arm to cause the second arm to come in contact with the conveyed article, controls the first adjuster to apply an acceleration force to the conveyed article, and controls the second adjuster to apply a deceleration force to the conveyed article. In the second control, the controller controls the swing angle of the first arm to cause the first arm to come in contact with the conveyed article, controls the swing angle of the second arm to cause the second arm to come in contact with the conveyed article, controls the first adjuster to apply a deceleration force to the conveyed article, and controls the second adjuster to apply an acceleration force to the conveyed article.

In this structure, the posture of the conveyed article being transported on the conveyor can be changed using the first arm and the second arm located on both sides of the transportation center line in the width direction. More specifically, the first control is performed to apply an acceleration force to the conveyed article with the first adjuster supported by the first arm and a deceleration force to the conveyed article with the second adjuster supported by the second arm, thus rotating the conveyed article clockwise in a plan view. The second control is performed to apply a deceleration force to the conveyed article with the first adjuster supported by the first arm and an acceleration force to the conveyed article with the second adjuster supported by the second arm, thus rotating the conveyed article counterclockwise in a plan view.

In this structure, the first control and the second control are selectively performed to rotate the conveyed article being transported on the conveyor in an intended rotation direction in a plan view. This structure can thus easily adjust the posture of the conveyed article being transported on the conveyor. Additionally, the swing angle of the first arm and the swing angle of the second arm are controlled to apply an acceleration force or a deceleration force to a conveyed article having any shape with the first adjuster and the second adjuster. The postures of conveyed articles having any shapes can also be changed.

Further aspects and features of the conveyed article posture adjustment device will be apparent from embodiments described below with reference to the drawings.

DESCRIPTION OF THE INVENTION

Figure 1:
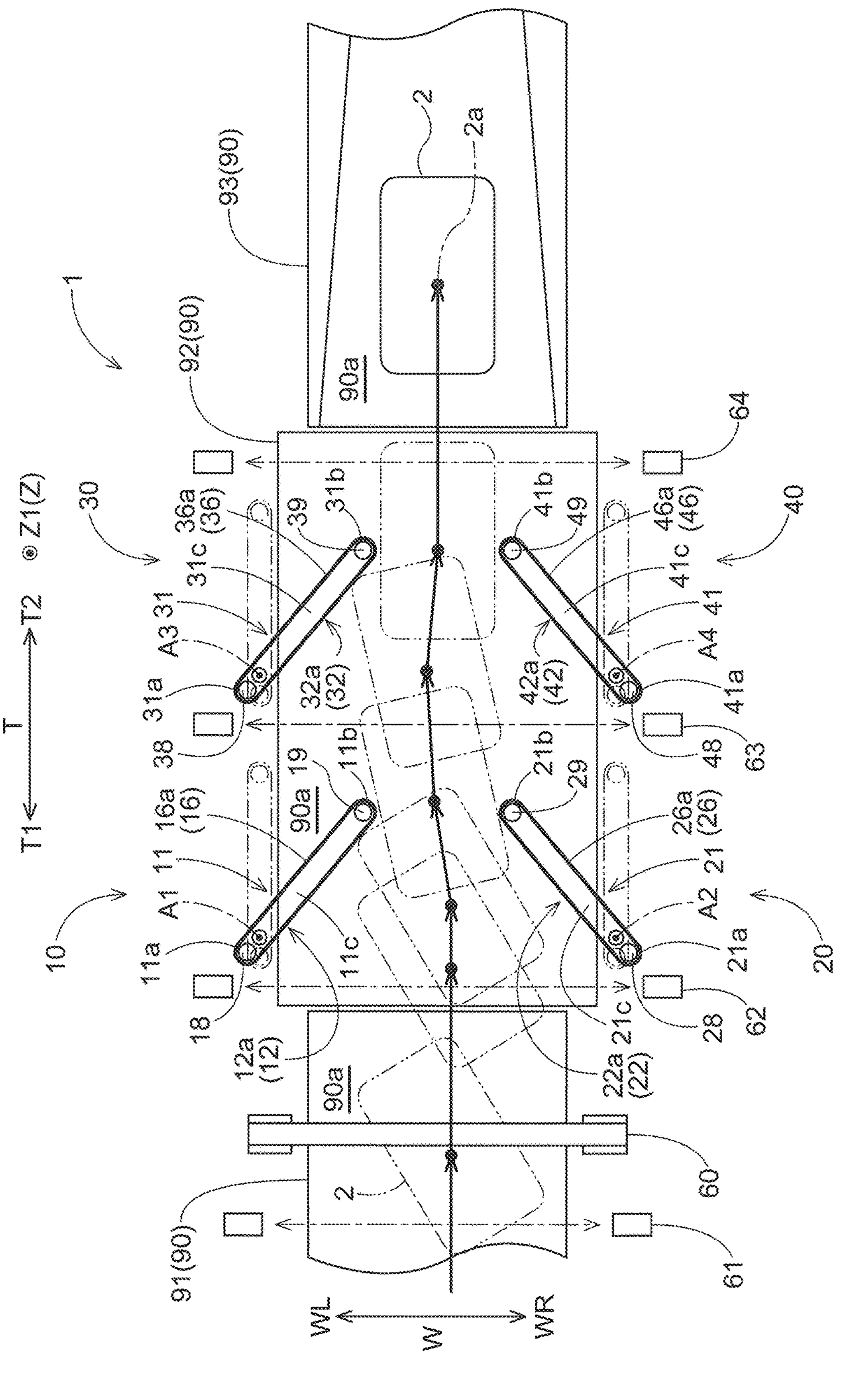
FIG. 1 is a plan view of a conveyed article posture adjustment device according to an embodiment.
Figure 2:
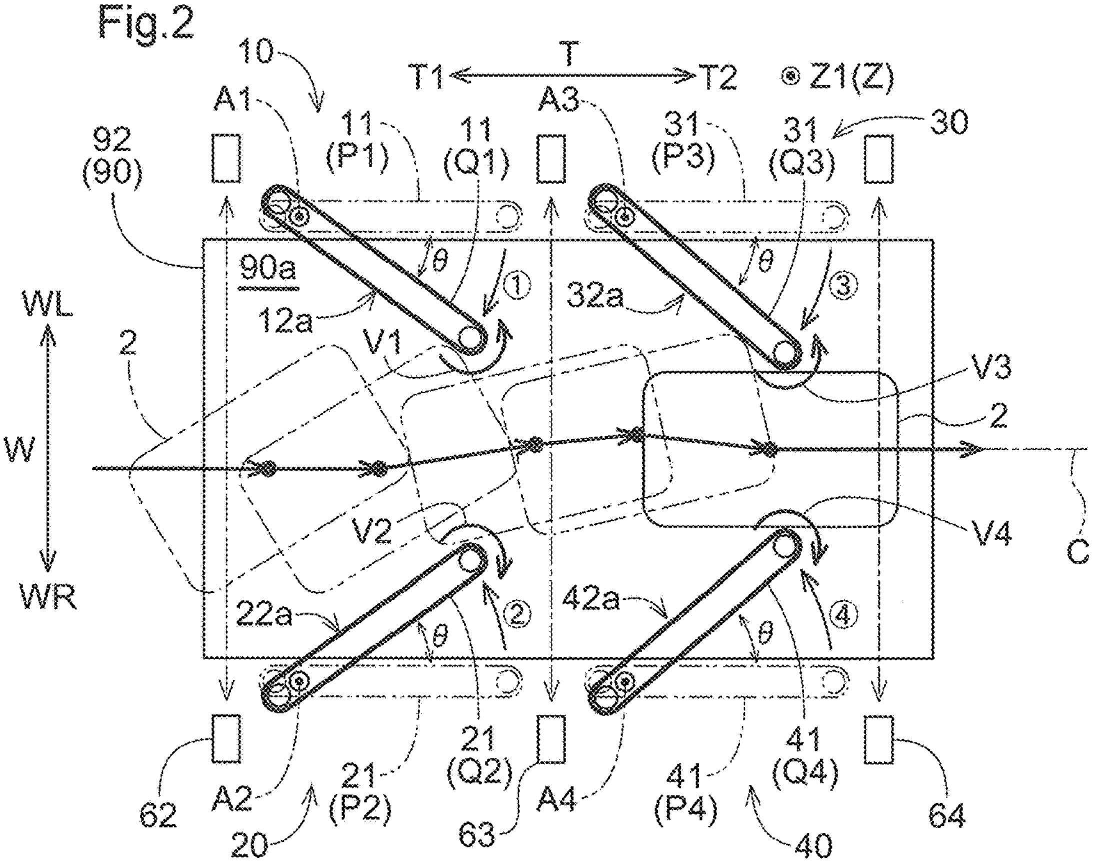
FIG. 2 is a diagram of a conveyed article rotated clockwise in a plan view.
Figure 3:
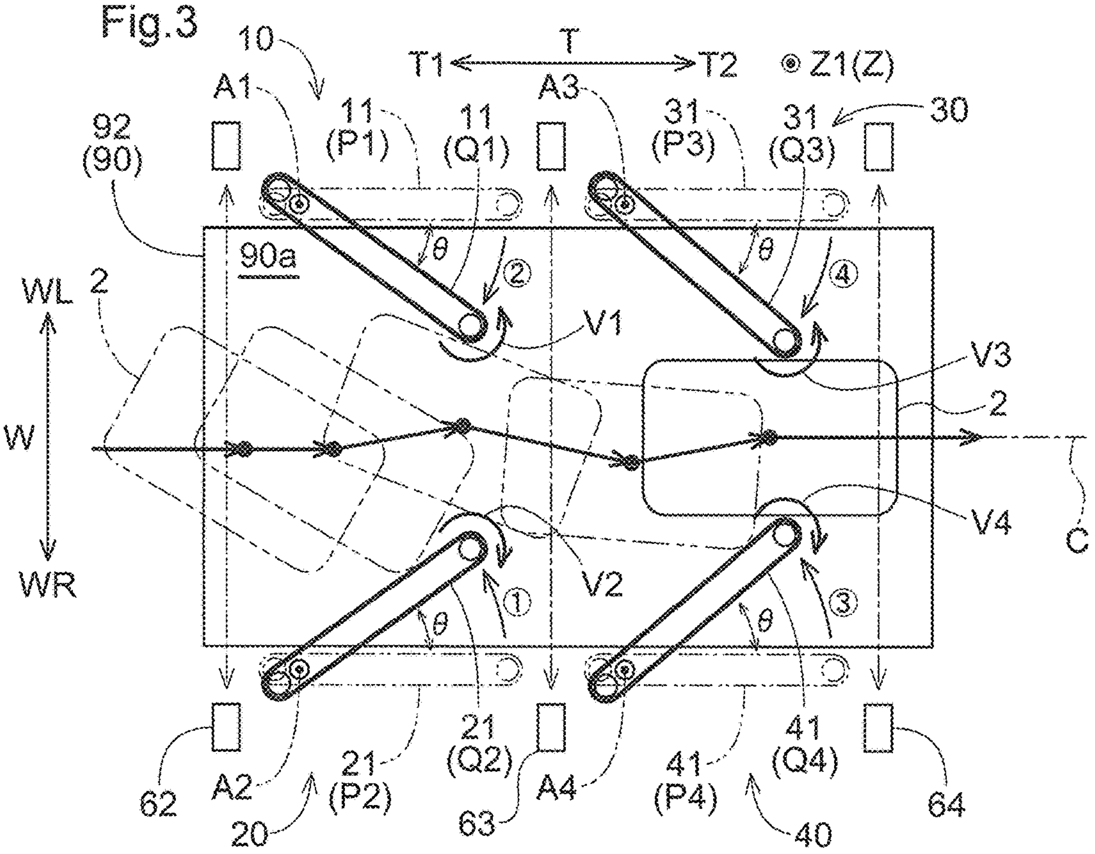
FIG. 3 is a diagram of the conveyed article rotated counterclockwise in a plan view.

A conveyed article posture adjustment device according to an embodiment will be described with reference to the drawings. A conveyed article posture adjustment device 1 is used for a conveyor 90. FIG. 1 is a diagram of an example conveyor 90 for which the conveyed article posture adjustment device 1 is used. As shown in FIG. 1, the conveyor 90 transports, in a predetermined transport direction T, a conveyed article 2 on a placement surface 90*a* from an upstream end T1 in the transport direction toward a downstream end T2 in the transport direction. The conveyed article 2 may have a solid shape such as a hard case or a flexible shape (e.g., the shape of a bottom surface) such as a cloth bag. The conveyed article 2 is, for example, baggage of an aircraft passenger. A direction perpendicular to the transport direction T as viewed in a vertical direction Z (the vertical direction) (in a plan view) is defined as a width direction W. The left in the width direction W as viewed toward the downstream end T2 in the transport direction is defined as a left WL in the width direction. The right in the width direction W as viewed toward the downstream end T2 in the transport direction is defined as a right WR in the width direction. The width direction W is a horizontal direction perpendicular to the transport direction T. As shown in FIGS. 2 and 3, an imaginary line passing through a center portion of the placement surface 90*a* in the width direction W and extending in the transport direction T is defined as a transportation center line C.

In the example shown in FIG. 1, the conveyor 90 incudes a first conveyor 91, a second conveyor 92, and a third conveyor 93 in order from the upstream end T1 in the transport direction. As indicated by the arrows, which indicate the movement path of a center 2*a* of the conveyed article 2, in FIG. 1, the conveyed article 2 is sequentially transported by the first conveyor 91, the second conveyor 92, and the third conveyor 93. The conveyor 90 is, for example, a belt conveyor or a roller conveyor. For the conveyor 90 being a belt conveyor including a belt to be circulated and moved in the transport direction T, the upper surface of the belt is the placement surface 90*a*. For the conveyor 90 being a roller conveyor including multiple conveyor rollers (drive rollers that are driven to rotate) aligned in the transport direction T, a plane (imaginary plane) including an upper end of each of the multiple conveyor rollers is the placement surface 90*a*.

As shown in FIG. 1, the conveyed article posture adjustment device 1 includes a first adjustment device 10 and a second adjustment device 20. In the present embodiment, the conveyed article posture adjustment device 1 further includes a third adjustment device 30 and a fourth adjustment device 40.

Figure 8:
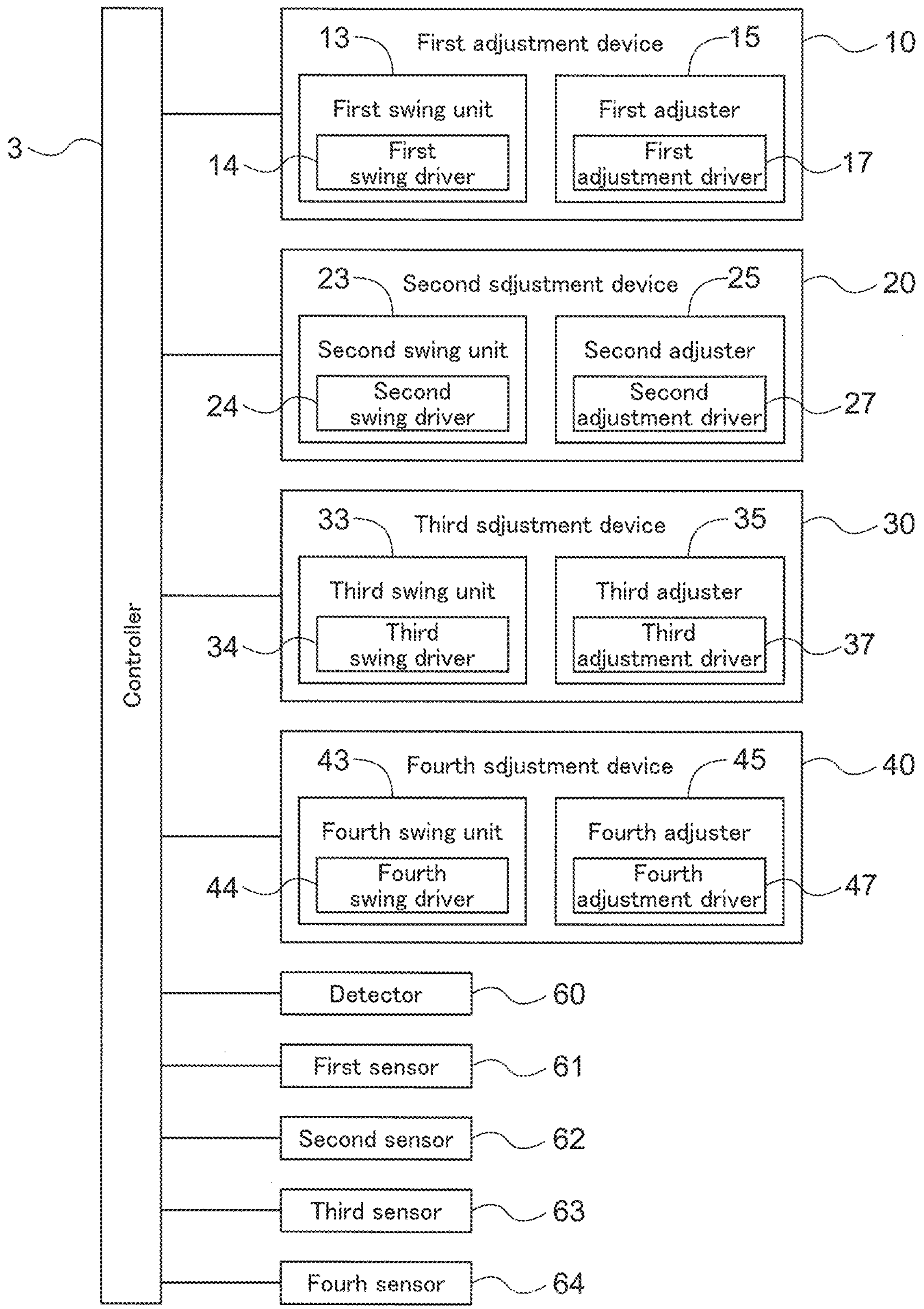
FIG. 8 is a control block diagram.

As shown in FIGS. 1 and 8, the first adjustment device 10 includes a first arm 11, a first swing unit 13, and a first adjuster 15. As shown in FIGS. 2 and 3, the first arm 11 is located in an upper area Z1 above the placement surface 90*a* (on the front of the page of FIGS. 2 and 3) and on the left WL to the transportation center line C in the width direction. The first arm 11 is swingable about a first swing axis A1 extending in the vertical direction Z. The first swing axis A1 may not be an actual shaft, and may be an imaginary axis.

The first swing unit 13 causes the first arm 11 to swing about the first swing axis A1. As shown in FIG. 8, the first swing unit 13 includes a first swing driver 14 (e.g., an electric motor or a cylinder) that drives the first arm 11 (drives the first arm 11 to swing). The first swing unit 13 transmits a driving force of the first swing driver 14 to the first arm 11 to cause the first arm 11 to swing. The driving force is transmitted from the first swing driver 14 to the first arm 11 through, for example, a power transmission (e.g., a gear, a linkage, or a belt) included in the first swing unit 13.

As shown in FIG. 1, the first arm 11 includes a first basal end 11*a* that is a portion in which the first swing axis A1 is located, a first distal end 11*b* that is an end closer to the downstream end T2 than the first basal end 11*a* in the transport direction, and a first target area 12*a* that is an area of a first side peripheral surface 12. The first target area 12*a* may face at least the transportation center line C. The first side peripheral surface 12 is a surface (the outer surface or the outer peripheral surface) of the first arm 11 facing in the horizontal direction. The first target area 12*a* is an area of the first side peripheral surface 12 that extends along the entire circumference of the first arm 11. More specifically, the first target area 12*a* is an area of the first side peripheral surface 12 that may face the transportation center line C as the first arm 11 swings. Facing the transportation center line C refers to an outward normal direction (normal vector) that has a component toward the transportation center line C. For the first arm 11 and a third arm 31 (described later), the component toward the transportation center line C is a component toward the right WR in the width direction. For a second arm 21 (described later) and a fourth arm 41 (described later), the component toward the transportation center line C is a component toward the left WL in the width direction.

The first adjuster 15 (at least a first circulating unit 16 described below) is supported by by the first arm 11. The first adjuster 15 applies a force (a force in a direction along the placement surface 90*a*) to the conveyed article 2 in contact with the first arm 11. As shown in FIGS. 1 and 8, the first adjuster 15 includes the first circulating unit 16 located on the first side peripheral surface 12 (at least the first target area 12*a*) to circulate about an axis extending in the vertical direction Z at the first distal end 11*b*, and a first adjustment driver 17 (e.g., an electric motor) that drives the first circulating unit 16. The first adjuster 15 transmits a driving force of the first adjustment driver 17 to the first circulating unit 16 to drive the first circulating unit 16 to circulate as described above.

The first circulating unit 16 is located at least in the first target area 12*a* of the first side peripheral surface 12. In the present embodiment, the first circulating unit 16 is located in the entire area of the first side peripheral surface 12. In the present embodiment, as shown in FIG. 1, the first circulating unit 16 includes a first endless member 16*a* wound along the first side peripheral surface 12 of the first arm 11. The first adjuster 15 circulates and moves the first endless member 16*a* using a driving force of the first adjustment driver 17 to drive the first circulating unit 16.

The first endless member 16*a* is located in the first target area 12*a* to circulate about an axis extending in the vertical direction Z at the first basal end 11*a* and about an axis extending in the vertical direction Z at the first distal end 11*b*. More specifically, the first adjuster 15 includes a first drive pulley 18 that is driven to rotate by the first adjustment driver 17 at the first basal end 11*a*, and a first follower pulley 19 that freely rotates at the first distal end 11*b*. The first drive pulley 18 and the first follower pulley 19 are supported by a first body 11*c* that is a body of the first arm 11 in a manner rotatable about the respective axes extending in the vertical direction Z. The first body 11*c* is, for example, a frame plate. The first endless member 16*a* is wound around the first drive pulley 18 and the first follower pulley 19. More specifically, a belt serving as the first endless member 16*a* is looped around the first drive pulley 18 and the first follower pulley 19 with its width in the vertical direction Z. Although the first drive pulley 18 is located on an axis different from the first swing axis A1 in the example shown in FIG. 1, the first drive pulley 18 may be located on the first swing axis A1.

As shown in FIG. 1, the second adjustment device 20 corresponds to the first adjustment device 10 inverted in the width direction W (more specifically, the second adjustment device 20 is plane symmetric to the first adjustment device 10 with a vertical plane including the transportation center line C as a symmetry plane) or the first adjustment device 10 inverted in the width direction W and moved parallel to the transport direction T. Thus, the second adjustment device 20 will be described below, but similar components corresponding to the components in the first adjustment device 10 will not be described. In the present embodiment, the second adjustment device 20 is at the same position as the first adjustment device 10 in the transport direction T. The second adjustment device 20 thus corresponds to the first adjustment device 10 inverted in the width direction W. The second adjustment device 20 may be at a position different from the position of the first adjustment device 10 in the transport direction T. In this case, the second adjustment device 20 may be located in an area in the transport direction T that overlaps the area in the transport direction T in which the first adjustment device 10 is located.

As shown in FIGS. 1 and 8, the second adjustment device 20 includes a second arm 21, a second swing unit 23, and a second adjuster 25. As shown in FIGS. 2 and 3, the second arm 21 is located in the upper area Z1 above the placement surface 90*a* and on the right WR to the transportation center line C in the width direction. The second arm 21 is swingable about a second swing axis A2 extending in the vertical direction Z. The second swing unit 23 causes the second arm 21 to swing about the second swing axis A2. As shown in FIG. 8, the second swing unit 23 includes a second swing driver 24 that drives the second arm 21 (drives the second arm 21 to swing). The second arm 21 corresponds to the first arm 11. The second swing unit 23 corresponds to the first swing unit 13. The second swing driver 24 corresponds to the first swing driver 14. The second adjuster 25 corresponds to the first adjuster 15. The second swing axis A2 corresponds to the first swing axis A1. A common driver that serves as the first swing driver 14 and the second swing driver 24 may drive both the first arm 11 and the second arm 21.

As shown in FIG. 1, the second arm 21 includes a second basal end 21*a* that is a portion in which the second swing axis A2 is located, a second distal end 21*b* that is an end closer to the downstream end T2 than the second basal end 21*a* in the transport direction, and a second target area 22*a* that is an area of a second side peripheral surface 22 facing in the horizontal direction. The second target area 22*a* may face at least the transportation center line C. The second basal end 21*a* corresponds to the first basal end 11*a*. The second distal end 21*b* corresponds to the first distal end 11*b*. The second side peripheral surface 22 corresponds to the first side peripheral surface 12. The second target area 22*a* corresponds to the first target area 12*a*.

The second adjuster 25 (at least a second circulating unit 26 described below) is supported by the second arm 21. The second adjuster 25 applies a force (a force in the direction along the placement surface 90*a*) to the conveyed article 2 in contact with the second arm 21. The second adjuster 25 includes the second circulating unit 26 located on the second side peripheral surface 22 (at least the second target area 22*a*) to circulate about an axis extending in the vertical direction Z at the second distal end 21*b*, and a second adjustment driver 27 that drives the second circulating unit 26. In the present embodiment, the second circulating unit 26 includes a second endless member 26*a* looped along the second side peripheral surface 22 of the second arm 21. A second drive pulley 28 and a second follower pulley 29 are supported by a second body 21*c* that is a body of the second arm 21 in a manner rotatable about the respective axes extending in the vertical direction Z. The second endless member 26*a* is looped around the second drive pulley 28 and the second follower pulley 29. The second body 21*c* corresponds to the first body 11*c*. The second circulating unit 26 corresponds to the first circulating unit 16. The second endless member 26*a* corresponds to the first endless member 16*a*. The second adjustment driver 27 corresponds to the first adjustment driver 17. The second drive pulley 28 corresponds to the first drive pulley 18. The second follower pulley 29 corresponds to the first follower pulley 19.

As shown in FIG. 1, the third adjustment device 30 corresponds to the first adjustment device 10 moved in parallel toward the downstream end T2 in the transport direction. Thus, the third adjustment device 30 will be described below, but similar components corresponding to the components in the first adjustment device 10 will not be described.

As shown in FIGS. 1 and 8, the third adjustment device 30 includes a third arm 31, a third swing unit 33, and a third adjuster 35. As shown in FIGS. 2 and 3, the third arm 31 is located in the upper area Z1 above the placement surface 90*a* closer to the downstream end T2 than the first swing axis A1 (in other words, the first basal end 11*a*; refer to FIG. 1) in the transport direction and on the left WL to the transportation center line C in the width direction. The third arm 31 is swingable about a third swing axis A3 extending in the vertical direction Z. The third swing unit 33 causes the third arm 31 to swing about the third swing axis A3. As shown in FIG. 8, the third swing unit 33 includes a third swing driver 34 that drives the third arm 31 (drives the third arm 31 to swing). The third arm 31 corresponds to the first arm 11. The third swing unit 33 corresponds to the first swing unit 13. The third swing driver 34 corresponds to the first swing driver 14. The third adjuster 35 corresponds to the first adjuster 15. The third swing axis A3 corresponds to the first swing axis A1.

As shown in FIG. 1, the third arm 31 includes a third basal end 31*a* that is a portion in which the third swing axis A3 is located, a third distal end 31*b* that is an end closer to the downstream end T2 than the third basal end 31*a* in the transport direction, and a third target area 32*a* that is an area of a third side peripheral surface 32 facing in the horizontal direction. The third target area 32*a* may face at least the transportation center line C. The third basal end 31*a* corresponds to the first basal end 11*a*. The third distal end 31*b* corresponds to the first distal end 11*b*. The third side peripheral surface 32 corresponds to the first side peripheral surface 12. The third target area 32*a* corresponds to the first target area 12*a*.

The third adjuster 35 (at least a third circulating unit 36 described below) is supported by the third arm 31. The third adjuster 35 applies a force (a force in the direction along the placement surface 90*a*) to the conveyed article 2 in contact with the third arm 31. The third adjuster 35 includes the third circulating unit 36 located on the third side peripheral surface 32 (at least the third target area 32*a*) to circulate about an axis extending in the vertical direction Z at the third distal end 31*b*, and a third adjustment driver 37 that drives the third circulating unit 36. In the present embodiment, the third circulating unit 36 includes a third endless member 36*a* looped along the third side peripheral surface 32 of the third arm 31. A third drive pulley 38 and a third follower pulley 39 are supported by a third body 31*c* that is a body of the third arm 31 in a manner rotatable about the respective axes extending in the vertical direction Z. The third endless member 36*a* is looped around the third drive pulley 38 and the third follower pulley 39. The third body 31*c* corresponds to the first body 11*c*. The third circulating unit 36 corresponds to the first circulating unit 16. The third endless member 36*a* corresponds to the first endless member 16*a*. The third adjustment driver 37 corresponds to the first adjustment driver 17. The third drive pulley 38 corresponds to the first drive pulley 18. The third follower pulley 39 corresponds to the first follower pulley 19.

As shown in FIG. 1, the fourth adjustment device 40 corresponds to the first adjustment device 10 inverted in the width direction W and moved in parallel toward the downstream end T2 in the transport direction. Thus, the fourth adjustment device 40 will be described below, but similar components corresponding to the components in the first adjustment device 10 will not be described. In the present embodiment, the fourth adjustment device 40 is at the same position as the third adjustment device 30 in the transport direction T. The fourth adjustment device 40 thus corresponds to the third adjustment device 30 inverted in the width direction W. The fourth adjustment device 40 may be located at a position different from the position of the third adjustment device 30 in the transport direction T. In this case, the fourth adjustment device 40 may be located in an area in the transport direction T that overlaps the area in the transport direction T in which the third adjustment device 30 is located.

As shown in FIGS. 1 and 8, the fourth adjustment device 40 includes a fourth arm 41, a fourth swing unit 43, and a fourth adjuster 45. As shown in FIGS. 2 and 3, the fourth arm 41 is located in the upper area Z1 above the placement surface 90*a* closer to the downstream end T2 in the width direction than the second swing axis A2 (in other words, the second basal end 21*a*; refer to FIG. 1) in the transport direction and on the right WR to the transportation center line C. The fourth arm 41 is swingable about a fourth swing axis A4 extending in the vertical direction Z. The fourth swing unit 43 causes the fourth arm 41 to swing about the fourth swing axis A4. As shown in FIG. 8, the fourth swing unit 43 includes a fourth swing driver 44 that drives the fourth arm 41 (drives the fourth arm 41 to swing). The fourth arm 41 corresponds to the first arm 11. The fourth swing unit 43 corresponds to the first swing unit 13. The fourth swing driver 44 corresponds to the first swing driver 14. The fourth adjuster 45 corresponds to the first adjuster 15. The fourth swing axis A4 corresponds to the first swing axis A1. A common driver that serves as the third swing driver 34 and the fourth swing driver 44 may drive both the third arm 31 and the fourth arm 41.

Figure 4:
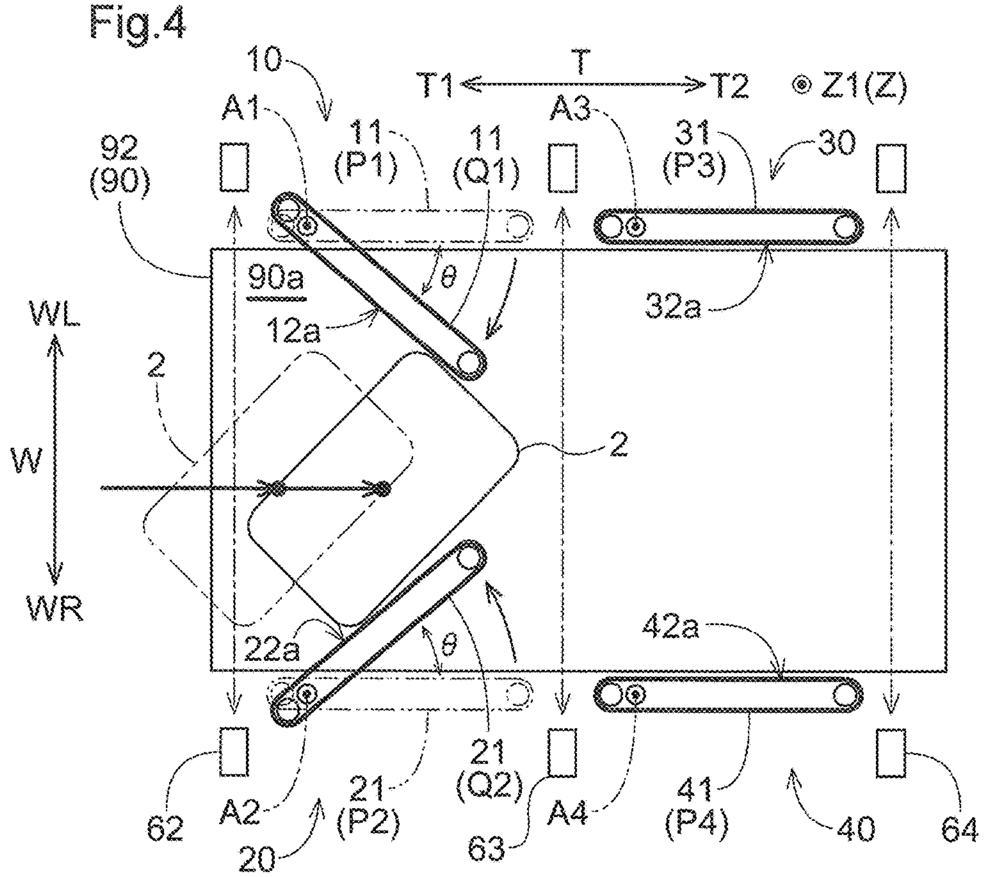
FIG. 4 is a diagram of an example situation of the conveyed article not being transported downstream in a transport direction.

As shown in FIG. 4, the fourth arm 41 includes a fourth basal end 41*a* that is a portion in which the fourth swing axis A4 is located, the fourth distal end 41*b* that is an end closer to the downstream end T2 than the fourth basal end 41*a* in the transport direction, and a fourth target area 42*a* that is an area of a fourth side peripheral surface 42 facing in the horizontal direction. The fourth target area 42*a* may face at least the transportation center line C. The fourth basal end 41*a* corresponds to the first basal end 11*a*. The fourth distal end 41*b* corresponds to the first distal end 11*b*. The fourth side peripheral surface 42 corresponds to the first side peripheral surface 12. The fourth target area 42*a* corresponds to the first target area 12*a*.

The fourth adjuster 45 (at least a fourth circulating unit 46 described below) is supported by the fourth arm 41. The fourth adjuster 45 applies a force (a force in the direction along the placement surface 90*a*) to the conveyed article 2 in contact with the fourth arm 41. The fourth adjuster 45 includes the fourth circulating unit 46 located on the fourth side peripheral surface 42 (at least the fourth target area 42*a*) to circulate about an axis extending in the vertical direction Z at the fourth distal end 41*b*, and a fourth adjustment driver 47 that drives the fourth circulating unit 46. In the present embodiment, the fourth circulating unit 46 includes a fourth endless member 46*a* looped along the fourth side peripheral surface 42 of the fourth arm 41. A fourth drive pulley 48 and a fourth follower pulley 49 are supported by a fourth body 41*c* that is a body of the fourth arm 41 in a manner rotatable about the respective axes extending in the vertical direction Z. The fourth endless member 46*a* is looped around the fourth drive pulley 48 and the fourth follower pulley 49. The fourth body 41*c* corresponds to the first body 11*c*. The fourth circulating unit 46 corresponds to the first circulating unit 16. The fourth endless member 46*a* corresponds to the first endless member 16*a*. The fourth adjustment driver 47 corresponds to the first adjustment driver 17. The fourth drive pulley 48 corresponds to the first drive pulley 18. The fourth follower pulley 49 corresponds to the first follower pulley 19.

The conveyed article posture adjustment device 1 includes a controller 3 (refer to FIG. 8). The controller 3 controls the operations of the first adjustment device 10 and the second adjustment device 20. In the present embodiment, the controller 3 further controls the operations of the third adjustment device 30 and the fourth adjustment device 40 to adjust the posture of the conveyed article 2 being transported on the conveyor 90. More specifically, the controller 3 controls driving of the swing driver and the adjustment driver in each adjustment device (e.g., the first swing driver 14 and the first adjustment driver 17 in the first adjustment device 10) to control the operation (more specifically, the adjustment operation for the posture of the conveyed article 2) of each adjustment device. The functions of the controller 3 are implemented by hardware such as an arithmetic processor and a program executable on the hardware operating in cooperation with each other. The controller 3 may be a set of multiple pieces of hardware (multiple separate pieces of hardware) that can communicate with one another in a wired or wireless manner, rather than a single piece of hardware.

The technical features of the controller 3 described herein are applicable to a control method for the conveyed article posture adjustment device 1 (more specifically, for the first adjustment device 10 and the second adjustment device 20, and in the present embodiment, further for the third adjustment device 30 and the fourth adjustment device 40). The control method for the conveyed article posture adjustment device 1 is also described herein. In the present embodiment, the control method includes a process in which the controller 3 performs the processing (steps) shown in FIG. 9.

In the present embodiment, as shown in FIG. 1, the conveyed article posture adjustment device 1 includes a detector 60 that detects the posture of the conveyed article 2 on the placement surface 90*a*. The detector 60 detects the posture of the conveyed article 2 on the placement surface 90*a* closer to the upstream end T1 than the first adjustment device 10 and the second adjustment device 20 in the transport direction. In the example shown in FIG. 1, the first adjustment device 10 and the second adjustment device 20 adjust the posture of the conveyed article 2 being transported on the second conveyor 92, and the detector 60 detects the posture of the conveyed article 2 on the placement surface 90*a* of the first conveyor 91.

As shown in FIG. 8, the controller 3 can obtain detection information from the detector 60. The controller 3 obtains the posture (orientation) of the conveyed article 2 based on the detection information from the detector 60. For example, with either or both a laser scanner and an image sensor used as the detector 60, the controller 3 can obtain three-dimensional image data of the conveyed article 2 by three-dimensional image processing based on the detection information from the detector 60, and obtain the posture of the conveyed article 2 from the obtained three-dimensional image data. The controller 3 may obtain either or both the dimensions and the position (the position on the placement surface 90*a*) of the conveyed article 2, in addition to the posture of the conveyed article 2, based on the detection information from the detector 60. The detector 60 may not be a laser scanner or an image sensor. For example, the detector 60 may include photoelectric sensors (e.g., light-shielding photoelectric sensors that detect an object based on the absence of detection light) located at multiple sites. The detector 60 may have the accuracy of detecting the posture of the conveyed article 2 that allows determination as to whether the posture of the conveyed article 2 is to be changed.

In the present embodiment, as shown in FIG. 1, the conveyed article posture adjustment device 1 includes a first sensor 61, a second sensor 62, a third sensor 63, and a fourth sensor 64. The first sensor 61, the second sensor 62, the third sensor 63, and the fourth sensor 64 are located in this order from the upstream end T1 in the transport direction. As shown in FIG. 8, the controller 3 can obtain detection information from the first sensor 61, the second sensor 62, the third sensor 63, and the fourth sensor 64. The controller 3 obtains the position (the position in the transport direction T) of the conveyed article 2 based on the detection information from these sensors (61 to 64). The sensors (61 to 64) may be, for example, photoelectric sensors (e.g., light-shielding photoelectric sensors that detect an object based on the absence of detection light).

The first sensor 61 detects the conveyed article 2 arriving at a position closer to the upstream end T1 in the transport direction than the detection position of the posture of the conveyed article 2 detected by the detector 60 (a position on the first conveyor 91 in the example shown in FIG. 1). In other words, the first sensor 61 detects the conveyed article 2 arriving at a position closer to the upstream end T1 than the detector 60 in the transport direction.

The second sensor 62 detects the conveyed article 2 arriving at a position closer to the downstream end T2 in the transport direction than the detection position of the posture of the conveyed article 2 detected by the detector 60 and closer to the upstream end T1 in the transport direction than the adjustment position of the posture of the conveyed article 2 adjusted by the first adjustment device 10 and the second adjustment device 20 (a position on the second conveyor 92 in the example shown in FIG. 1). In other words, the second sensor 62 detects the conveyed article 2 arriving at a position closer to the downstream end T2 than the detector 60 in the transport direction and closer to the upstream end T1 than the first arm 11 and the second arm 21 in the transport direction.

The third sensor 63 detects the conveyed article 2 arriving at a position closer to the downstream end T2 in the transport direction than the adjustment position of the posture of the conveyed article 2 adjusted by the first adjustment device 10 and the second adjustment device 20 and closer to the upstream end T1 in the transport direction than the adjustment position of the posture of the conveyed article 2 adjusted by the third adjustment device 30 and the fourth adjustment device 40 (a position on the second conveyor 92 in the example shown in FIG. 1). In other words, the third sensor 63 detects the conveyed article 2 arriving at a position closer to the downstream end T2 than the first arm 11 and the second arm 21 in the transport direction and closer to the upstream end T1 than the third arm 31 and the fourth arm 41 in the transport direction.

The fourth sensor 64 detects the conveyed article 2 arriving at a position closer to the downstream end T2 in the transport direction than the adjustment position of the posture of the conveyed article 2 adjusted by the third adjustment device 30 and the fourth adjustment device 40. In other words, the fourth sensor 64 detects the conveyed article 2 arriving at a position closer to the downstream end T2 than the third arm 31 and the fourth arm 41 in the transport direction.

The controller 3 detects the posture of the conveyed article 2 with the detector 60 at the time when the conveyed article 2 is detected by the first sensor 61 or at the time after a predetermined time from when the conveyed article 2 is detected by the first sensor 61. The controller 3 starts adjusting the posture of the conveyed article 2 with the first adjustment device 10 and the second adjustment device 20 (more specifically, the controller 3 starts first control or second control described later) at the time when the conveyed article 2 is detected by the second sensor 62 or at the time after a predetermined time from when the conveyed article 2 is detected by the second sensor 62. The controller 3 starts adjusting the posture of the conveyed article 2 with the third adjustment device 30 and the fourth adjustment device 40 (more specifically, the controller 3 starts third control described later) at the time when the conveyed article 2 is detected by the third sensor 63 or at the time after a predetermined time from when the conveyed article 2 is detected by the third sensor 63.

Figure 9:
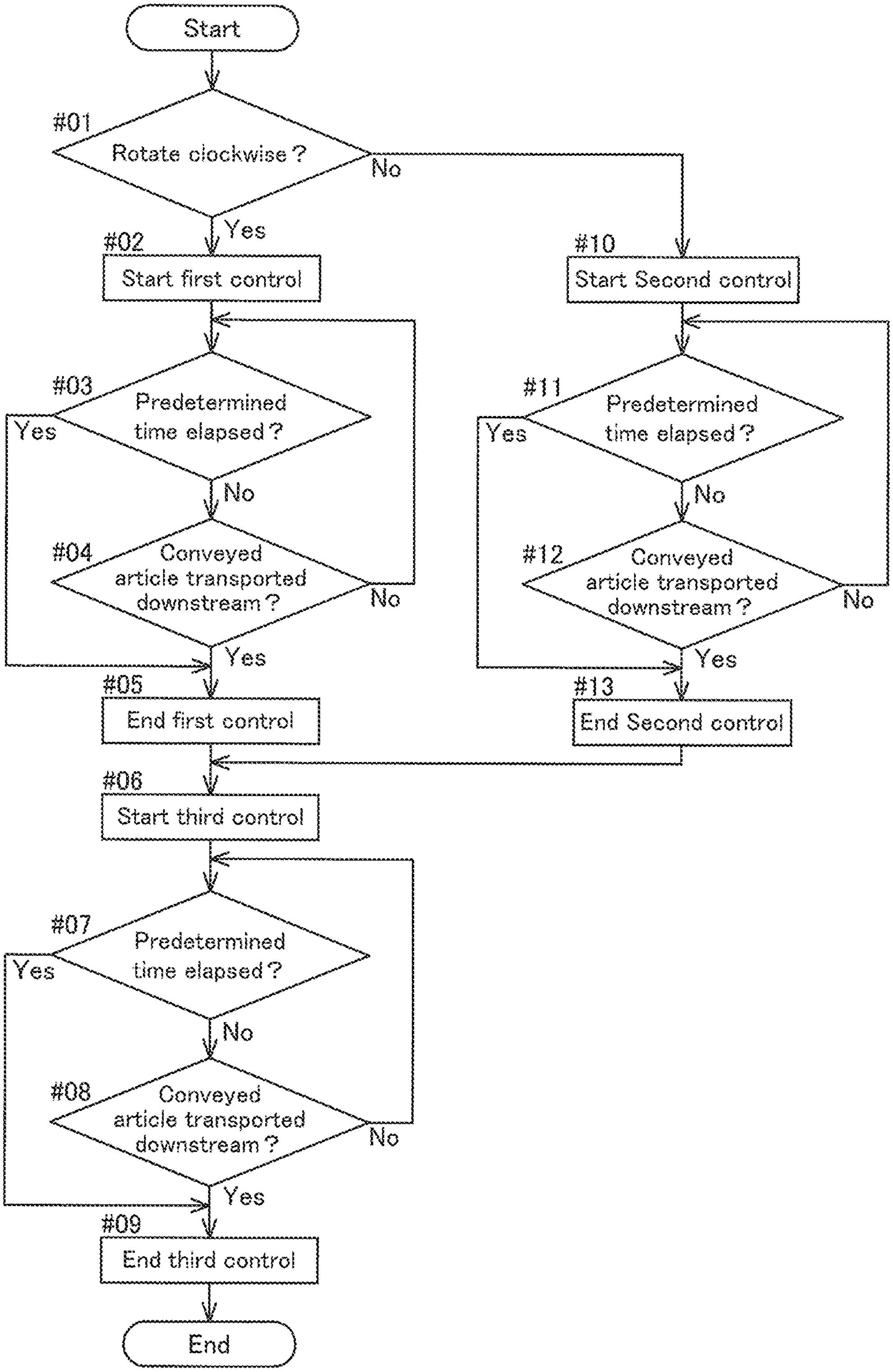
FIG. 9 is a flowchart of control.

As shown in FIG. 9, when the conveyed article 2 is to be rotated clockwise in a plan view (Yes in step #01), the controller 3 performs the first control (step #02). When the conveyed article 2 is to be rotated counterclockwise in a plan view (No in step #01), the controller 3 performs the second control (step #10). The first control and the second control will be described later. In the present embodiment, the controller 3 determines the direction in which the conveyed article 2 is to be rotated in a plan view based on the posture of the conveyed article 2 detected by the detector 60, and performs the first control or the second control based on the determined rotation direction.

When the conveyed article 2 can have proper posture by rotating the conveyed article 2 clockwise by an angle less than or equal to 90 degrees in a plan view, the controller 3 determines that the conveyed article 2 is rotated counterclockwise with respect to the proper posture in a plan view, and thus determines to rotate the conveyed article 2 clockwise in a plan view. When the conveyed article 2 can have the proper posture by rotating the conveyed article 2 counterclockwise by an angle less than or equal to 90 degrees in a plan view, the controller 3 determines that the conveyed article 2 is rotated clockwise with respect to the proper posture in a plan view, and thus determines to rotate the conveyed article 2 counterclockwise in a plan view. When the conveyed article 2 can have the proper posture either by rotating, in a plan view, the conveyed article 2 clockwise by an angle equal to 90 degrees or by rotating the conveyed article 2 counterclockwise by an angle equal to 90 degrees, the controller 3 determines to rotate the conveyed article 2 clockwise in a plan view or determines to rotate the conveyed article 2 counterclockwise in a plan view.

In a specific situation, the controller 3 may determine that the conveyed article 2 is not to be rotated in any of the directions in a plan view, and thus may perform neither the first control nor the second control. Examples of the specific situation include a situation in which the rotation angle of the conveyed article 2 in a plan view that allows the conveyed article 2 to have the proper posture is less than or equal to a predetermined angle (e.g., less than or equal to three degrees) and a situation in which the size of the conveyed article 2 in the width direction W is less than or equal to an allowable value. The allowable value is, for example, a value allowed in an area closer to the downstream end T2 in the transport direction than an installation area of the conveyed article posture adjustment device 1 (a destination of the third conveyor 93 in the example shown in FIG. 1).

The proper posture described above may be, for example, the posture in which the conveyed article 2 has its side surface parallel to the transport direction T in a plan view. When the conveyed article 2 has a rectangular outer shape having two long sides and two short sides in a plan view as in the examples shown in FIGS. 2 and 3, the proper posture of the conveyed article 2 can be the posture in which the conveyed article 2 has the long sides parallel to the transport direction T (the posture of the conveyed article 2 indicated by the solid line in FIGS. 2 and 3).

As in the example shown in FIG. 2, when the posture of the conveyed article 2 (the conveyed article 2 indicated by the two-dot-dash line uppermost to the upstream end T1 in the transport direction in FIG. 2) entering an installation area of the first adjustment device 10 and the second adjustment device 20 in a plan view is rotated counterclockwise with respect to the proper posture (the posture in which the long sides of the rectangle as the outer shape of the conveyed article 2 in a plan view are parallel to the transport direction T in FIGS. 2 and 3), the controller 3 determines to rotate the conveyed article 2 clockwise in a plan view. As in the example shown in FIG. 3, when the conveyed article 2 (the conveyed article 2 indicated by the two-dot-dash line uppermost to the upstream end T1 in the transport direction in FIG. 3) entering the installation area of the first adjustment device 10 and the second adjustment device 20 in a plan view is rotated clockwise with respect to the proper posture, the controller 3 determines to rotate the conveyed article 2 counterclockwise in a plan view.

In the present embodiment, when the conveyed article 2 is to be rotated clockwise in a plan view (Yes in step #01), the controller 3 performs the third control in addition to the first control (steps #02 and #06). When the conveyed article 2 is to be rotated counterclockwise in a plan view (No in step #01), the controller 3 performs the third control in addition to the second control (steps #10 and #06). The third control will be described later.

In the present embodiment, as shown in FIG. 9, the controller 3 ends the first control and starts the third control (steps #05 and #06) at the earlier one of the time when the elapsed time from the start of the first control reaches a predetermined time (Yes in step #03) or the time when the conveyed article 2 is transported toward the downstream end T2 in the transport direction from the first arm 11 and the second arm 21 (Yes in step #04). In the present embodiment, the controller 3 ends the second control and starts the third control (steps #13 and #06) at the earlier one of the time when the elapsed time from the start of the second control reaches the predetermined time (Yes in step #11) or the time when the conveyed article 2 is transported toward the downstream end T2 in the transport direction from the first arm 11 and the second arm 21 (Yes in step #12). The third control may be started before the first control or the second control is ended. In the example shown in FIG. 1, for example, when the conveyed article 2 is detected by the third sensor 63 or when the conveyed article 2 is no longer detected by the third sensor 63 after the conveyed article 2 is detected by the third sensor 63, the conveyed article 2 can be determined to have been transported toward the downstream end T2 in the transport direction from the first arm 11 and the second arm 21.

In the present embodiment, as shown in FIG. 9, the controller 3 ends the third control (step #09) at the earlier one of the time when the elapsed time from the start of the third control reaches the predetermined time (Yes in step #07) or the time when the conveyed article 2 is transported toward the downstream end T2 in the transport direction from the third arm 31 and the fourth arm 41 (Yes in step #08). In the example shown in FIG. 1, for example, when the conveyed article 2 is detected by the fourth sensor 64 or when the conveyed article 2 is no longer detected by the fourth sensor 64 after the conveyed article 2 is detected by the fourth sensor 64, the conveyed article 2 can be determined to have been transported toward the downstream end T2 in the transport direction from the third arm 31 and the fourth arm 41.

The first control, the second control, and the third control described above will now be described. The first arm 11, the second arm 21, the third arm 31, and the fourth arm 41 will be hereafter referred to as arms without being distinguished from one another when the features common to these arms are described. The first circulating unit 16, the second circulating unit 26, the third circulating unit 36, and the fourth circulating unit 46 will be referred to as circulating units without being distinguished from one another when the features common to these circulating units are described.

In the first control, the controller 3 controls a swing angle θ of the first arm 11 to cause the first arm 11 (more specifically, the first target area 12*a*) to come in contact with the conveyed article 2, and controls the swing angle θ of the second arm 21 to cause the second arm 21 (more specifically, the second target area 22*a*) to come in contact with the conveyed article 2. The controller 3 also controls the first adjuster 15 to apply an acceleration force to the conveyed article 2, and controls the second adjuster 25 to apply a deceleration force to the conveyed article 2 (more specifically, the controller 3 controls the first adjustment driver 17 and the second adjustment driver 27 to apply an acceleration force to the conveyed article 2 with the first circulating unit 16 and a deceleration force to the conveyed article 2 with the second circulating unit 26). The first swing driver 14 is controlled to control the swing angle θ of the first arm 11. The second swing driver 24 is controlled to control the swing angle θ of the second arm 21. FIG. 2 shows the conveyed article 2 being rotated clockwise in a plan view in the first control.

In the second control, the controller 3 controls the swing angle θ of the first arm 11 to cause the first arm 11 (more specifically, the first target area 12*a*) to come in contact with the conveyed article 2, and controls the swing angle θ of the second arm 21 to cause the second arm 21 (more specifically, the second target area 22*a*) to come in contact with the conveyed article 2. The controller 3 also controls the first adjuster 15 to apply a deceleration force to the conveyed article 2, and controls the second adjuster 25 to apply an acceleration force to the conveyed article 2 (more specifically, the controller 3 controls the first adjustment driver 17 and the second adjustment driver 27 to apply a deceleration force to the conveyed article 2 with the first circulating unit 16 and an acceleration force to the conveyed article 2 with the second circulating unit 26). FIG. 3 shows the conveyed article 2 being rotated counterclockwise in a plan view in the second control.

In the third control in the present embodiment, the controller 3 controls the swing angle θ of the third arm 31 to cause the third arm 31 (more specifically, the third target area 32*a*) to come in contact with the conveyed article 2, and controls the swing angle θ of the fourth arm 41 to cause the fourth arm 41 (more specifically, the fourth target area 42*a*) to come in contact with the conveyed article 2. The third swing driver 34 is controlled to control the swing angle θ of the third arm 31. The fourth swing driver 44 is controlled to control the swing angle θ of the fourth arm 41. FIGS. 2 and 3 show the conveyed article 2 having posture being adjusted in the first control or the second control and then further adjusted in the third control.

In the first control and the second control, the first target area 12*a* of the first arm 11 comes in contact with the conveyed article 2, and thus a portion of the first circulating unit 16 in the first target area 12*a* comes in contact with the conveyed article 2. This causes a force to be applied to the conveyed article 2 from the first circulating unit 16. The second target area 22*a* of the second arm 21 comes in contact with the conveyed article 2, and thus a portion of the second circulating unit 26 in the second target area 22*a* comes in contact with the conveyed article 2. This causes a force to be applied to the conveyed article 2 from the second circulating unit 26.

In the third control, the third target area 32*a* of the third arm 31 comes in contact with the conveyed article 2, and thus a portion of the third circulating unit 36 in the third target area 32*a* comes in contact with the conveyed article 2. This causes a force to be applied to the conveyed article 2 from the third circulating unit 36. The fourth target area 42*a* of the fourth arm 41 comes in contact with the conveyed article 2, and thus a portion of the fourth circulating unit 46 in the fourth target area 42*a* comes in contact with the conveyed article 2. This causes a force to be applied to the conveyed article 2 from the fourth circulating unit 46.

As shown in FIGS. 2 and 3, the circulating speed of the first circulating unit 16 (the first endless member 16*a* included in the first circulating unit 16 in the present embodiment) is referred to as a first circulating speed V1, the circulating speed of the second circulating unit 26 (the second endless member 26*a* included in the second circulating unit 26 in the present embodiment) is referred to as a second circulating speed V2, the circulating speed of the third circulating unit 36 (the third endless member 36*a* included in the third circulating unit 36 in the present embodiment) is referred to as a third circulating speed V3, and the circulating speed of the fourth circulating unit 46 (the fourth endless member 46*a* included in the fourth circulating unit 46 in the present embodiment) is referred to as a fourth circulating speed V4. For the first circulating speed V1 and the third circulating speed V3, the direction for circulating counterclockwise (the direction indicated by the arrows in FIGS. 2 and 3) in a plan view is the positive direction. For the second circulating speed V2 and the fourth circulating speed V4, the direction for circulating clockwise (the direction indicated by the arrows in FIGS. 2 and 3) in a plan view is the positive direction.

An acceleration force is applied to the conveyed article 2 with the circulating units by setting the circulating speeds (more specifically, transport direction speeds described later) of the circulating units higher than the transportation speed of the conveyed article 2 on the conveyor 90 (the second conveyor 92 in the examples shown in FIGS. 1 to 3; the same applies hereafter). A deceleration force is applied to the conveyed article 2 with the circulating units by setting the circulating speeds (more specifically, the transport direction speeds described later) of the circulating units lower than the transportation speed of the conveyed article 2 on the conveyor 90. Setting the circulating speeds lower than the transportation speed of the conveyed article 2 on the conveyor 90 includes setting the circulating speeds to zero and setting the directions of the circulating speeds opposite to the direction of the transportation speed (in other words, setting the circulating speeds to negative).

As shown in FIGS. 2 and 3, the posture of the first arm 11 parallel to the transport direction T (in other words, the posture in which the direction connecting the first basal end 11*a* and the first distal end 11*b* is parallel to the transport direction T) is referred to as a first reference posture P1, the posture of the second arm 21 parallel to the transport direction T (in other words, the posture in which the direction connecting the second basal end 21*a* and the second distal end 21*b* is parallel to the transport direction T) is referred to as a second reference posture P2, the posture of the third arm 31 parallel to the transport direction T (in other words, the posture in which the direction connecting the third basal end 31*a* and the third distal end 31*b* is parallel to the transport direction T) is referred to as a third reference posture P3, and the posture of the fourth arm 41 parallel to the transport direction T (in other words, the posture in which the direction connecting the fourth basal end 41*a* and the fourth distal end 41*b* is parallel to the transport direction T) is referred to as a fourth reference posture P4.

In the present embodiment, as shown in FIGS. 2 and 3, the swing angle θ of each arm is an inclination angle with respect to the transport direction T. The transport direction speed, which is a movement speed of each circulating unit in a direction parallel to the transport direction T, is thus a speed obtained by multiplying the circulating speed of the circulating unit by the cosine of the swing angle θ of the arm (more specifically, the arm including the circulating unit). In other words, to match the transport direction speed with a target speed, the circulating speed of the circulating unit is to be a speed obtained by dividing the target speed by the cosine described above. Based on the above, the first adjustment driver 17, the second adjustment driver 27, the third adjustment driver 37, and the fourth adjustment driver 47 have the structures described below.

The first circulating speed V1 at the first reference posture P1 corresponding to a first target speed (a target value of the transport direction speed of the first circulating unit 16) is referred to as a first reference posture target speed, the second circulating speed V2 at the second reference posture P2 corresponding to a second target speed (a target value of the transport direction speed of the second circulating unit 26) is referred to as a second reference posture target speed, the third circulating speed V3 at the third reference posture P3 corresponding to a third target speed (a target value of the transport direction speed of the third circulating unit 36) is referred to as a third reference posture target speed, and the fourth circulating speed V4 at the fourth reference posture P4 corresponding to a fourth target speed (a target value of the transport direction speed of the fourth circulating unit 46) is referred to as a fourth reference posture target speed.

The first adjuster 15 (more specifically, the first adjustment driver 17) increases the first circulating speed V1, even when the first target speed remains unchanged, from the first reference posture target speed in response to the swing angle θ of the first arm 11 increasing from the first reference posture P1. The second adjuster 25 (more specifically, the second adjustment driver 27) increases the second circulating speed V2, even when the second target speed remains unchanged, from the second reference posture target speed in response to the swing angle θ of the second arm 21 increasing from the second reference posture P2. The third adjuster 35 (more specifically, the third adjustment driver 37) increases the third circulating speed V3, even when the third target speed remains unchanged, from the third reference posture target speed in response to the swing angle θ of the third arm 31 increasing from the third reference posture P3. The fourth adjuster 45 (more specifically, the fourth adjustment driver 47) increases the fourth circulating speed V4, even when the fourth target speed remains unchanged, from the fourth reference posture target speed in response to the swing angle θ of the fourth arm 41 increasing from the fourth reference posture P4. The first adjustment driver 17, the second adjustment driver 27, the third adjustment driver 37, and the fourth adjustment driver 47 adjust the circulating speeds in this manner under the control of the controller 3.

In the present embodiment, the first adjustment driver 17 increases the first circulating speed V1 from the first reference posture target speed to cause the first target speed to be a speed obtained by multiplying the first circulating speed V1 by the cosine of the swing angle θ of the first arm 11. The second adjustment driver 27 increases the second circulating speed V2 from the second reference posture target speed to cause the second target speed to be a speed obtained by multiplying the second circulating speed V2 by the cosine of the swing angle θ of the second arm 21. The third adjustment driver 37 increases the third circulating speed V3 from the third reference posture target speed to cause the third target speed to be a speed obtained by multiplying the third circulating speed V3 by the cosine of the swing angle θ of the third arm 31. The fourth adjustment driver 47 increases the fourth circulating speed V4 from the fourth reference posture target speed to cause the fourth target speed to be a speed obtained by multiplying the fourth circulating speed V4 by the cosine of the swing angle θ of the fourth arm 41. Thus, the transport direction speed of the first circulating unit 16 is equivalent to the first target speed independently of the swing angle θ of the first arm 11. The transport direction speed of the second circulating unit 26 is equivalent to the second target speed independently of the swing angle θ of the second arm 21. The transport direction speed of the third circulating unit 36 is equivalent to the third target speed independently of the swing angle θ of the third arm 31. The transport direction speed of the fourth circulating unit 46 is equivalent to the fourth target speed independently of the swing angle θ of the fourth arm 41.

The controller 3 sets the first target speed and the second target speed to cause, for example, the average of the first target speed and the second target speed to match the transportation speed of the conveyed article 2 on the conveyor 90. The rotation amount for the conveyed article 2 in the first control and the second control increases as the difference between the first target speed and the second target speed is larger. The difference in circulating speed between the first circulating unit 16 and the second circulating unit 26 (the difference between the first circulating speed V1 and the second circulating speed V2) is determined based on the difference between the first target speed and the second target speed, the swing angle θ of the first arm 11, and the swing angle θ of the second arm 21.

Based on the above, in the present embodiment, the controller 3 controls the difference in circulating speed between the first circulating unit 16 and the second circulating unit 26 in the first control or the second control as described below. The controller 3 sets a target rotation amount for the conveyed article 2 in the first control or the second control based on a detection result of the posture of the conveyed article 2 from the detector 60. More specifically, the controller 3 sets the target rotation amount to allow the conveyed article 2 to have the proper posture described above. The controller 3 then controls the difference in circulating speed between the first circulating unit 16 and the second circulating unit 26 in the first control or the second control based on the set target rotation amount. More specifically, the controller 3 sets the difference in circulating speed between the first circulating unit 16 and the second circulating unit 26 (in other words, the difference between the first target speed and the second target speed) to increase as the set target rotation amount increases.

In the first control and the second control, the controller 3 controls the swing angle θ of the first arm 11 to a first target swing angle and the swing angle θ of the second arm 21 to a second target swing angle. In the present embodiment, the controller 3 sets, based on the detection result of the posture of the conveyed article 2 from the detector 60, the first target swing angle and the second target swing angle to cause each of the first arm 11 (more specifically, the first target area 12*a*) and the second arm 21 (more specifically, the second target area 22*a*) to come in contact with the conveyed article 2 (refer to FIGS. 2 and 3). The controller 3 may set the first target swing angle and the second target swing angle based on either or both the dimensions and the position of the conveyed article 2 in addition to the posture of the conveyed article 2. Although the first target swing angle and the second target swing angle can be set to be different from each other, the first target swing angle and the second target swing angle are set to be the same in FIGS. 2 and 3.

In the third control, the controller 3 controls the swing angle θ of the third arm 31 to a third target swing angle and the swing angle θ of the fourth arm 41 to a fourth target swing angle. Although the third target swing angle and the fourth target swing angle can be set to be different from each other, the third target swing angle and the fourth target swing angle are set to be the same in FIGS. 2 and 3. In the present embodiment, the controller 3 sets the inclination angle (the inclination angle is equal to the swing angle θ in the present embodiment; the same applies hereafter) of the third arm 31 with respect to the transport direction T in the third control to be greater than the inclination angle of the first arm 11 with respect to the transport direction T in the first control and the second control, and sets the inclination angle of the fourth arm 41 with respect to the transport direction T in the third control to be greater than the inclination angle of the second arm 21 with respect to the transport direction T in the first control and the second control. In other words, the controller 3 sets the third target swing angle and the fourth target swing angle to cause the distance (hereafter referred to as a first distance) in the width direction W between the third distal end 31*b* and the fourth distal end 41*b* in the third control to be narrower than the distance (hereafter referred to as a second distance) in the width direction W between the first distal end 11*b* and the second distal end 21*b* in the first control and the second control. Although the first distance and the second distance are both set greater than the dimension of the conveyed article 2 in the proper posture in the width direction W, the first distance narrower than the second distance allows the conveyed article 2 to be aligned parallel to the transport direction T using the third arm 31 and the fourth arm 41 in the third control after the conveyed article 2 is rotated using the first arm 11 and the second arm 21 in the first control or the second control as shown in FIGS. 2 and 3.

In the present embodiment, as described above, the first control and the second control are performed mainly to rotate the conveyed article 2, whereas the third control is performed mainly to align the conveyed article 2. Thus, in the present embodiment, the controller 3 sets the third target speed and the fourth target speed to the same speed. In other words, in the third control, the controller 3 controls the third adjustment driver 37 and the fourth adjustment driver 47 to cause the third circulating speed V3 and the fourth circulating speed V4 to be equal to each other (more specifically, to cause the transport direction speed of the third circulating unit 36 and the transport direction speed of the fourth circulating unit 46 to be equal to each other). The third target speed and the fourth target speed are set equal to, for example, the transportation speed of the conveyed article 2 on the conveyor 90. The third target speed and the fourth target speed may be set higher or lower than the transportation speed of the conveyed article 2 on the conveyor 90.

In the first control and second control, the controller 3 performs first swing control to control the swing angle θ of the first arm 11 to place the first arm 11 in a first target posture Q1 (refer to FIGS. 2 and 3) and second swing control to control the swing angle θ of the second arm 21 to place the second arm 21 in a second target posture Q2 (refer to FIGS. 2 and 3). In first target posture Q1, the swing angle θ of the first arm 11 is the first target swing angle described above. In the second target posture Q2, the swing angle θ of the second arm 21 is the second target swing angle described above. In the first swing control, the swing angle θ of the first arm 11 is controlled to change the posture of the first arm 11 from the first reference posture P1 or a first intermediate posture (a posture between the first reference posture P1 and the first target posture Q1) to the first target posture Q1. In the second swing control, the swing angle θ of the second arm 21 is controlled to change the posture of the second arm 21 from the second reference posture P2 or a second intermediate posture (a posture between the second reference posture P2 and the second target posture Q2) to the second target posture Q2. When the first or the second control ends, the first arm 11 returns from the first target posture Q1 to the first reference posture P1 or the first intermediate posture, and the second arm 21 returns from the second target posture Q2 to the second reference posture P2 or the second intermediate posture.

In the third control, the controller 3 performs third swing control to control the swing angle θ of the third arm 31 to place the third arm 31 in a third target posture Q3, and fourth swing control to control the swing angle θ of the fourth arm 41 to place the fourth arm 41 in a fourth target posture Q4. In the third target posture Q3, the swing angle θ of the third arm 31 is the third target swing angle described above. In the fourth target posture Q4, the swing angle θ of the fourth arm 41 is the fourth target swing angle described above. In the third swing control, the swing angle θ of the third arm 31 is controlled to change the posture of the third arm 31 from the third reference posture P3 or a third intermediate posture (a posture between the third reference posture P3 and the third target posture Q3) to the third target posture Q3. In the fourth swing control, the swing angle θ of the fourth arm 41 is controlled to change the posture of the fourth arm 41 from the fourth reference posture P4 or a fourth intermediate posture (a posture between the fourth reference posture P4 and the fourth target posture Q4) to the fourth target posture Q4. When the third control ends, the third arm 31 returns from the third target posture Q3 to the third reference posture P3 or the third intermediate posture, and the fourth arm 41 returns from the fourth target posture Q4 to the fourth reference posture P4 or the fourth intermediate posture.

In the present embodiment, the controller 3 determines which of the first arm 11 in the first target posture Q1 or the second arm 21 in the second target posture Q2 comes in contact with the conveyed article 2 first based on the detection result of the posture of the conveyed article 2 from the detector 60. When the first arm 11 in the first target posture Q1 is determined to come in contact with the conveyed article 2 first, the controller 3 starts the first swing control before the second swing control (starts the first swing control before the second swing control and starts the third swing control before the fourth swing control in the present embodiment). When the second arm 21 in the second target posture Q2 is determined to come in contact with the conveyed article 2 first, the controller 3 starts the second swing control before the first swing control (starts the second swing control before the first swing control and starts the fourth swing control before the third swing control in the present embodiment).

As shown in FIG. 2, when the first arm 11 in the first target posture Q1 comes in contact with the conveyed article 2 first, the controller 3 starts the first swing control before the second swing control and starts the third swing control before the fourth swing control. In this case, the controller 3 starts the second swing control after a predetermined time elapses from the start of the first swing control, and starts the fourth swing control after a predetermined time elapses from the start of the third swing control. As shown in FIG. 3, when the second arm 21 in the second target posture Q2 comes in contact with the conveyed article 2 first, the controller 3 starts the second swing control before the first swing control and starts the fourth swing control before the third swing control. In this case, the controller 3 starts the first swing control after a predetermined time elapses from the start of the second swing control, and starts the third swing control after a predetermined time elapses from the start of the fourth swing control. The circled numbers in FIGS. 2 and 3 indicate the order in which the first swing control, the second swing control, the third swing control, and the fourth swing control start.

Figure 5:
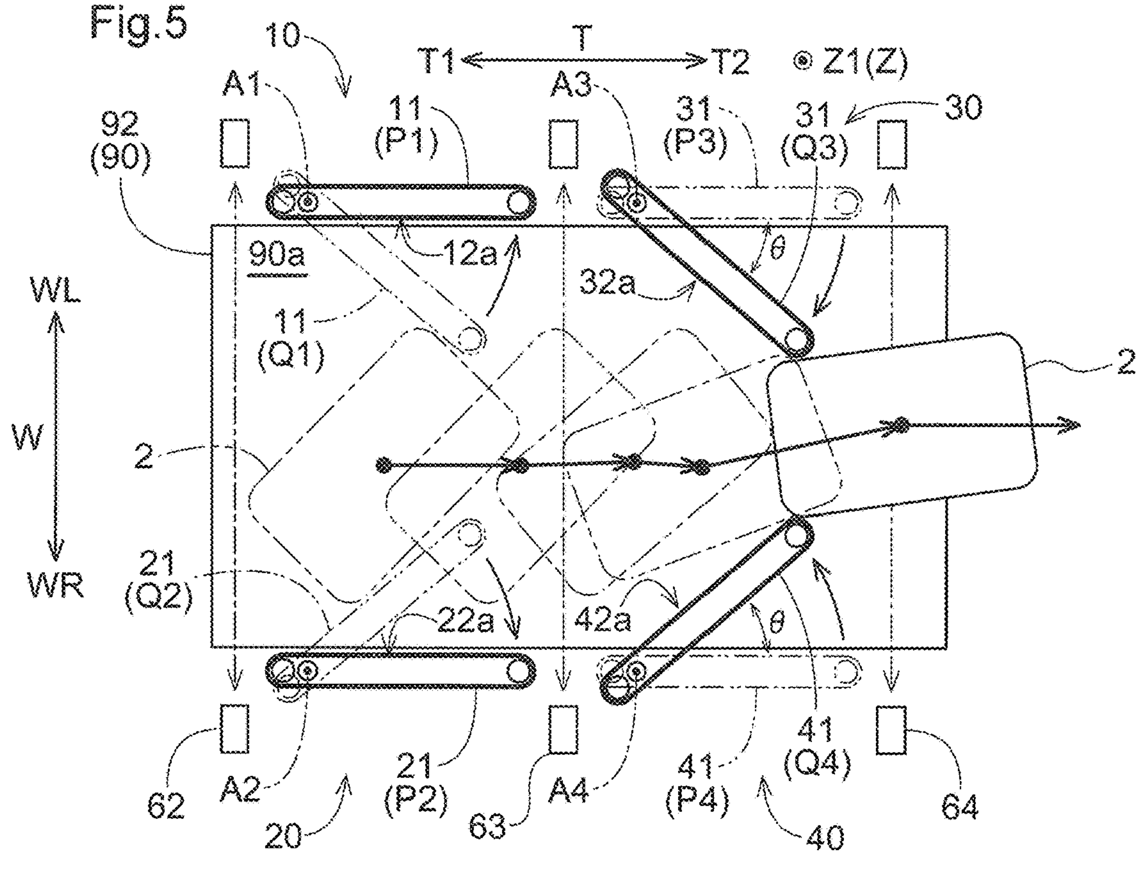
FIG. 5 is a diagram of an example situation of eliminating the conveyed article not being transported downstream in the transport direction.

The conveyed article 2 may be caught between the first arm 11 and the second arm 21 and may not be transported toward the downstream end T2 in the transport direction from the first arm 11 and the second arm 21 after the predetermined time elapses from when the controller 3 starts the first control or the second control (the determination result is affirmative in steps #03 and #11 in FIG. 9). FIG. 4 shows an example of such a situation. In the present embodiment, in this case, the controller 3 ends the first control or the second control being performed, and controls the swing angle θ of the first arm 11 to cause the first arm 11 (more specifically, the first target area 12*a*) to move away from the conveyed article 2 and controls the swing angle θ of the second arm 21 to cause the second arm 21 (more specifically, the second target area 22*a*) to move away from the conveyed article 2 (this control is hereafter referred to as first abnormality response control). In FIG. 5, in the first abnormality response control, the swing angle θ of the first arm 11 is controlled to cause the first arm 11 to return to the first reference posture P1, and the swing angle θ of the second arm 21 is controlled to cause the second arm 21 to return to the second reference posture P2. The first abnormality response control allows the conveyed article 2 to be transported toward the downstream end T2 in the transport direction from the first arm 11 and the second arm 21. The controller 3 may notify an abnormality by screen display or audio output instead of or in addition to the first abnormality response control.

In the present embodiment, when the controller 3 ends the first control being performed and performs the first abnormality response control, the controller 3 controls, in the third control performed thereafter (refer to FIG. 5), the third adjustment device 30 and the fourth adjustment device 40 in the same manner as the control of the first adjustment device 10 and the second adjustment device 20 in the first control. More specifically, in the third control, the controller 3 controls the swing angle θ of the third arm 31 to cause the third target area 32*a* of the third arm 31 to come in contact with the conveyed article 2, and controls the swing angle θ of the fourth arm 41 to cause the fourth target area 42*a* of the fourth arm 41 to come in contact with the conveyed article 2. The controller 3 also controls the third adjuster 35 to apply an acceleration force to the conveyed article 2, and controls the fourth adjuster 45 to apply a deceleration force to the conveyed article 2 (more specifically, the controller 3 controls the third adjustment driver 37 to apply an acceleration force to the conveyed article 2 with the third circulating unit 36, and controls the fourth adjustment driver 47 to apply a deceleration force to the conveyed article 2 with the fourth circulating unit 46). This allows the conveyed article 2 to be rotated clockwise in a plan view using the third arm 31 and the fourth arm 41 as shown in FIG. 5.

In the present embodiment, when the controller 3 ends the second control being performed and performs the first abnormality response control, the controller 3 controls, in the third control performed thereafter, the third adjustment device 30 and the fourth adjustment device 40 in the same manner as the control of the first adjustment device 10 and the second adjustment device 20 in the second control. More specifically, in the third control, the controller 3 controls the swing angle θ of the third arm 31 to cause the third target area 32*a* of the third arm 31 to come in contact with the conveyed article 2, and controls the swing angle θ of the fourth arm 41 to cause the fourth target area 42*a* of the fourth arm 41 to come in contact with the conveyed article 2. The controller 3 also controls the third adjuster 35 to apply a deceleration force to the conveyed article 2, and controls the fourth adjuster 45 to apply an acceleration force to the conveyed article 2 (more specifically, the controller 3 controls the third adjustment driver 37 to apply a deceleration force to the conveyed article 2 with the third circulating unit 36, and controls the fourth adjustment driver 47 to apply an acceleration force to the conveyed article 2 with the fourth circulating unit 46). This allows the conveyed article 2 to be rotated counterclockwise in a plan view using the third arm 31 and the fourth arm 41.

Figure 6:
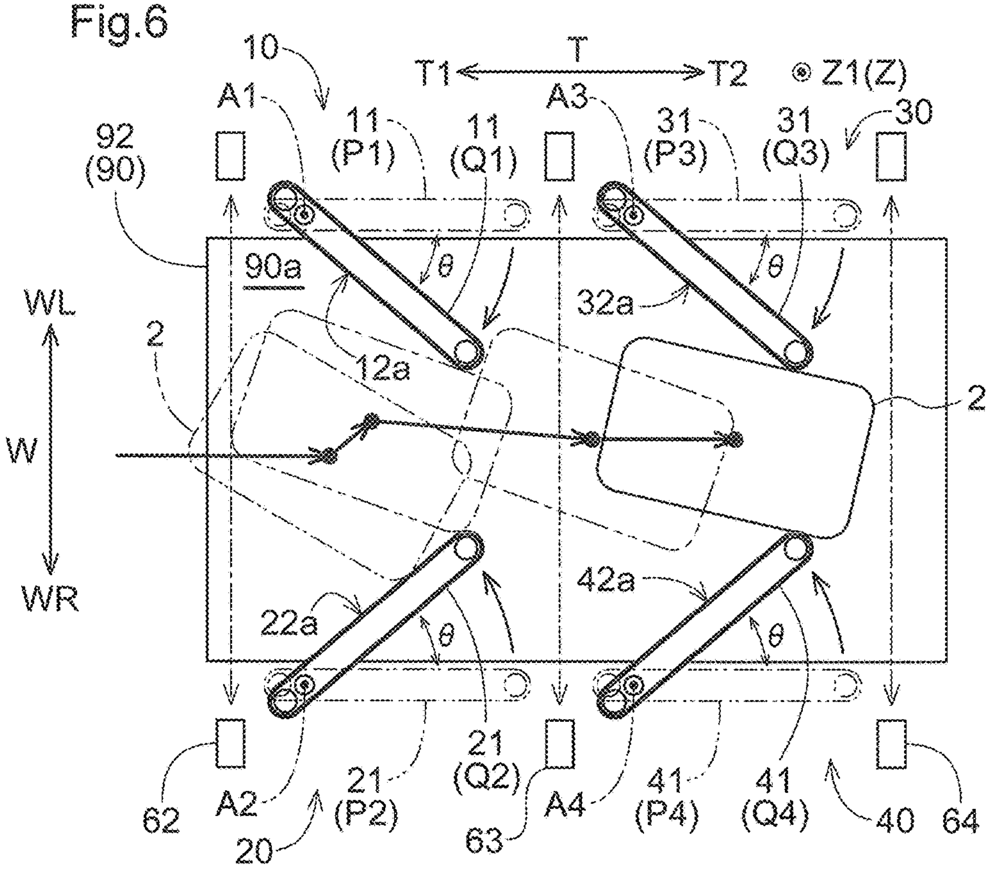
FIG. 6 is a diagram of another example situation of the conveyed article not being transported downstream in the transport direction.

The conveyed article 2 may be caught between the third arm 31 and the fourth arm 41 and may not be transported toward the downstream end T2 in the transport direction from the third arm 31 and the fourth arm 41 after the predetermined time elapses from when the controller 3 starts the third control (the determination result is affirmative in step #07 in FIG. 9). FIG. 6 shows an example of such a situation. In the present embodiment, in this case, the controller 3 ends the third control being performed, and controls the swing angle θ of the third arm 31 to cause the third arm 31 (more specifically, the third target area 32*a*) to move away from the conveyed article 2 and controls the swing angle θ of the fourth arm 41 to cause the fourth arm 41 (more specifically, the fourth target area 42*a*) to move away from the conveyed article 2 (this control is hereafter referred to as second abnormality response control). The second abnormality response control allows the conveyed article 2 to be transported toward the downstream end T2 in the transport direction from the third arm 31 and the fourth arm 41. The controller 3 may notify an abnormality by screen display or audio output instead of or in addition to the second abnormality response control.

Figure 7:
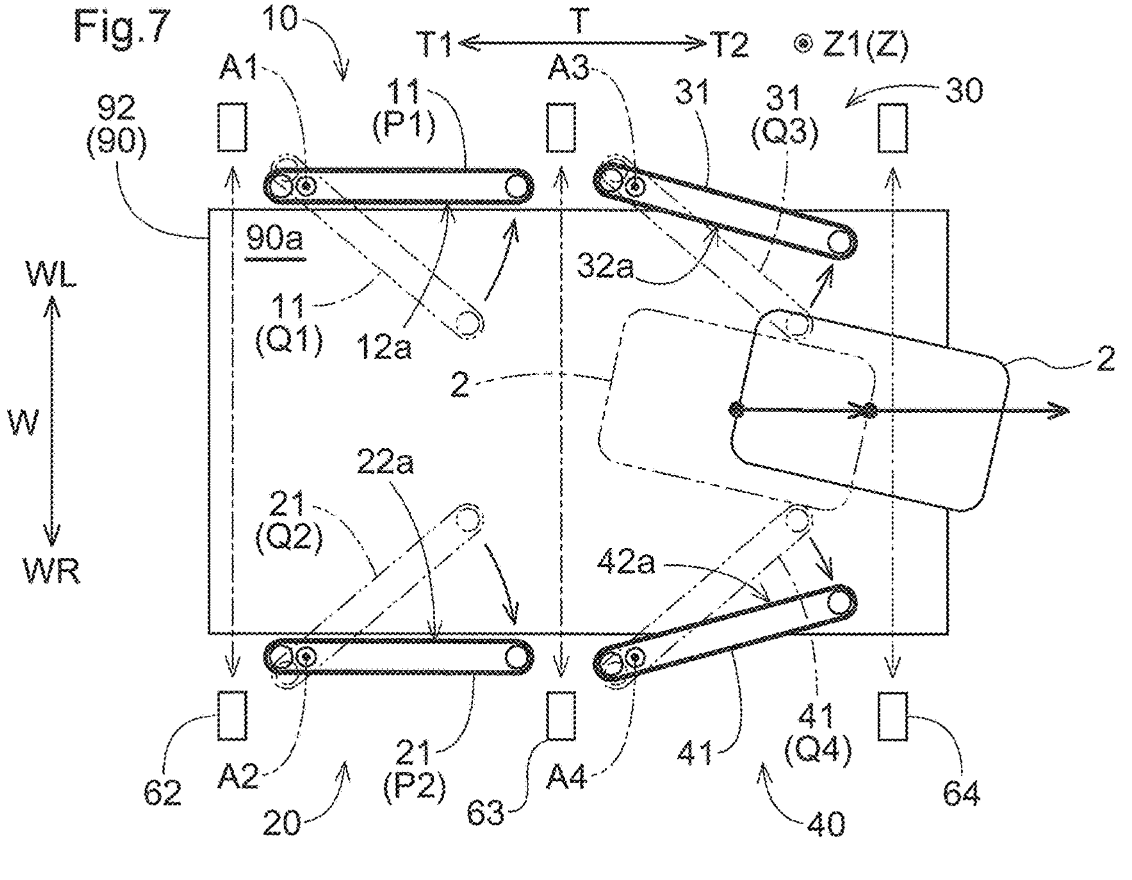
FIG. 7 is a diagram of another example situation of eliminating the conveyed article not being transported downstream in the transport direction.

In FIG. 7, in the second abnormality response control, the swing angle θ of the third arm 31 is controlled to cause the third arm 31 to return to the third intermediate posture (the posture between the third reference posture P3 and the third target posture Q3), and the swing angle θ of the fourth arm 41 is controlled to cause the fourth arm 41 to return to the fourth intermediate posture (the posture between the fourth reference posture P4 and the fourth target posture Q4). For example, in the second abnormality response control, the swing angle θ of each of the third arm 31 and the fourth arm 41 is controlled to cause the distance in the width direction W between the third distal end 31*b* and the fourth distal end 41*b* to match the size of the conveyed article 2 in the width direction W that is allowed in an area closer to the downstream end T2 in the transport direction than the installation area of the conveyed article posture adjustment device 1 (the destination of the third conveyor 93 in the example shown in FIG. 1).

OTHER EMBODIMENTS

A conveyed article posture adjustment device according to other embodiments will now be described.

(1) In the above embodiment, the controller 3 determines which of the first arm 11 in the first target posture Q1 or the second arm 21 in the second target posture Q2 comes in contact with the conveyed article 2 first based on the detection result of the posture of the conveyed article 2 from the detector 60. When the first arm 11 in the first target posture Q1 is determined to come in contact with the conveyed article 2 first, the controller 3 starts the first swing control before the second swing control and starts the third swing control before the fourth swing control. When the second arm 21 in the second target posture Q2 is determined to come in contact with the conveyed article 2 first, the controller 3 starts the second swing control before the first swing control and starts the fourth swing control before the third swing control. The disclosure is not limited to this structure. For example, when the conveyed article 2 is to be rotated clockwise in a plan view, the controller 3 may start the first swing control before the second swing control and the third swing control before the fourth swing control. When the conveyed article 2 is to be rotated counterclockwise in a plan view, the controller 3 may start the second swing control before the first swing control and the fourth swing control before the third swing control.

The three successive relations between a start timing of the first swing control and a start timing of the second swing control (starting one control first, starting the other control first, and starting both at the same time) and the three successive relations between a start timing of the third swing control and a start timing of the fourth swing control can be combined in any manner. For example, the controller 3 may start the first swing control and the second swing control at the same time and start the third swing control and the fourth swing control at the same time.

(2) In the above embodiment, the controller 3 sets the third target speed (the target value of the transport direction speed of the third circulating unit 36) and the fourth target speed (the target value of the transport direction speed of the fourth circulating unit 46) to the same speed. The disclosure is not limited to this structure. The controller 3 may set the third target speed and the fourth target speed to speeds different from each other. For example, in the third control when the conveyed article 2 is rotated clockwise in a plan view (in other words, the third control performed after the first control), the controller 3 may set the third target speed higher than the fourth target speed. In the third control when the conveyed article 2 is rotated counterclockwise in a plan view (in other words, the third control performed after the second control), the controller 3 may set the fourth target speed higher than the third target speed. In this case, in the third control performed after the first control, the controller 3 controls the third adjuster 35 to apply an acceleration force to the conveyed article 2, and controls the fourth adjuster 45 to apply a deceleration force to the conveyed article 2 (more specifically, the controller 3 controls the third adjustment driver 37 to apply an acceleration force to the conveyed article 2 with the third circulating unit 36 and controls the fourth adjustment driver 47 to apply a deceleration force to the conveyed article 2 with the fourth circulating unit 46). In the third control performed after the second control, the controller 3 may control the third adjuster 35 to apply a deceleration force to the conveyed article 2 and control the fourth adjuster 45 to apply an acceleration force to the conveyed article 2 (more specifically, controls the third adjustment driver 37 to apply a deceleration force to the conveyed article 2 with the third circulating unit 36, and controls the fourth adjustment driver 47 to apply an acceleration force to the conveyed article 2 with the fourth circulating unit 46).

(3) In the above embodiment, the controller 3 sets the inclination angle of the third arm 31 with respect to the transport direction T in the third control to be greater than the inclination angle of the first arm 11 with respect to the transport direction T in the first control and the second control, and sets the inclination angle of the fourth arm 41 with respect to the transport direction T in the third control to be greater than the inclination angle of the second arm 21 with respect to the transport direction T in the first control and the second control. The disclosure is not limited to this structure. For example, the controller 3 may set the inclination angle of the third arm 31 with respect to the transport direction T in the third control to be equal to the inclination angle of the first arm 11 with respect to the transport direction T in the first control and the second control, and may set the inclination angle of the fourth arm 41 with respect to the transport direction T in the third control to be equal to the inclination angle of the second arm 21 with respect to the transport direction T in the first control and the second control.

(4) In the above embodiment, the controller 3 controls, in the third control, the swing angle θ of the third arm 31 to cause the third arm 31 (more specifically, the third target area 32*a*) to come in contact with the conveyed article 2 and controls the swing angle θ of the fourth arm 41 to cause the fourth arm 41 (more specifically, the fourth target area 42*a*) to come in contact with the conveyed article 2. The disclosure is not limited to this structure. The controller 3 may control, in the third control, either the swing angle θ of the third arm 31 to cause the third arm 31 (more specifically, the third target area 32*a*) to come in contact with the conveyed article 2 (the third swing control described above) or the swing angle θ of the fourth arm 41 to cause the fourth arm 41 (more specifically, the fourth target area 42*a*) to come in contact with the conveyed article 2 (the fourth swing control described above). For example, in the third control performed after the first control, the controller 3 may perform the third swing control, and in the third control performed after the second control, the controller 3 may perform the fourth swing control.

(5) In the above embodiment, the first circulating unit 16 includes the first endless member 16*a*, the second circulating unit 26 includes the second endless member 26*a*, the third circulating unit 36 unit includes the third endless member 36*a*, and the fourth circulating unit 46 includes the fourth endless member 46*a*. The disclosure is not limited to this structure. For example, the first circulating unit 16 may include, in place of the first endless member 16*a*, conveyor rollers (drive rollers that are driven to rotate by the first adjustment driver 17) that are rotatable about axes extending in the vertical direction Z and that come in contact with the conveyed article 2 to apply a driving force. The conveyor rollers are, for example, arranged in the first target area 12*a* to be aligned in a direction in which the first arm 11 extends (an extension direction in a plan view). In this case, the conveyor roller located at the first distal end 11*b* of the multiple conveyor rollers is arranged in the first target area 12*a* to circulate about the axis at the first distal end 11*b* extending in the vertical direction Z. Similarly, the second circulating unit 26, the third circulating unit 36, and the fourth circulating unit 46 may include, in place of the endless member, conveyor rollers that are rotatable about axes extending in the vertical direction Z and that come in contact with the conveyed article 2 to apply a driving force.

(6) In the above embodiment, the conveyed article posture adjustment device 1 includes the third adjustment device 30 and the fourth adjustment device 40. The disclosure is not limited to this structure. The conveyed article posture adjustment device 1 may include no third adjustment device 30 or no fourth adjustment device 40.

(7) The structure described in each of the above embodiments may be combined with any other structures described in the other embodiments unless any contradiction arises. This also applies to combinations of the embodiments described as other embodiments. For other structures as well, the embodiments described herein are merely illustrative in all respects and may be modified variously as appropriate without departing from the spirit and scope of the disclosure.

OVERVIEW OF EMBODIMENTS

An overview of the conveyed article posture adjustment device described above will be described below.

A conveyed article posture adjustment device is a device for a conveyor to transport, in a predetermined transport direction, a conveyed article on a placement surface from upstream to downstream in the transport direction. The device includes a first adjustment device, a second adjustment device, and a controller. The first adjustment device includes a first arm located above the placement surface and on a left to a transportation center line in a width direction perpendicular to the transport direction as viewed in a vertical direction. The left in the width direction is a left as viewed downstream in the transport direction. The transportation center line is an imaginary line passing through a center portion of the placement surface in the width direction and extending in the transport direction. The first adjustment device includes a first swing unit that swings the first arm about a first swing axis extending in the vertical direction, and a first adjuster supported by the first arm to apply a force to the conveyed article in contact with the first arm. The second adjustment device includes a second arm located above the placement surface and on a right to the transportation center line in the width direction. The right in the width direction is a right as viewed downstream in the transport direction. The second adjustment device includes a second swing unit that swings the second arm about a second swing axis extending in the vertical direction, and a second adjuster supported by the second arm to apply a force to the conveyed article in contact with the second arm. The controller performs first control to rotate the conveyed article clockwise in a plan view and perform second control to rotate the conveyed article counterclockwise in a plan view. In the first control, the controller controls a swing angle of the first arm to cause the first arm to come in contact with the conveyed article, controls a swing angle of the second arm to cause the second arm to come in contact with the conveyed article, controls the first adjuster to apply an acceleration force to the conveyed article, and controls the second adjuster to apply a deceleration force to the conveyed article. In the second control, the controller controls the swing angle of the first arm to cause the first arm to come in contact with the conveyed article, controls the swing angle of the second arm to cause the second arm to come in contact with the conveyed article, controls the first adjuster to apply a deceleration force to the conveyed article, and controls the second adjuster to apply an acceleration force to the conveyed article.

In this structure, the posture of the conveyed article being transported on the conveyor can be changed using the first arm and the second arm located on both sides of the transportation center line in the width direction. More specifically, the first control is performed to apply an acceleration force to the conveyed article with the first adjuster supported by the first arm and a deceleration force to the conveyed article with the second adjuster supported by the second arm, thus rotating the conveyed article clockwise in a plan view. The second control is performed to apply a deceleration force to the conveyed article with the first adjuster supported by the first arm and an acceleration force to the conveyed article with the second adjuster supported by the second arm, thus rotating the conveyed article counterclockwise in a plan view.

In this structure, as described above, the first control and the second control are selectively performed to rotate the conveyed article being transported on the conveyor in an intended rotation direction in a plan view. This structure can easily adjust the posture of the conveyed article being transported on the conveyor. Additionally, the swing angle of the first arm and the swing angle of the second arm are controlled to apply an acceleration force or a deceleration force to a conveyed article having any shape with the first adjuster and the second adjuster. The postures of conveyed articles having any shapes are also changeable.

The first arm may have a first distal end being an end downstream in the transport direction from a portion in which the first swing axis is located. The first adjuster may include a first circulating unit located on a first side peripheral surface being a surface of the first arm facing in a horizontal direction to circulate about an axis extending in the vertical direction at the first distal end. The first circulating unit may include a first endless member looped along the first side peripheral surface of the first arm. The second arm may have a second distal end being an end downstream in the transport direction from a portion in which the second swing axis is located. The second adjuster may include a second circulating unit located on a second side peripheral surface being a surface of the second arm facing in the horizontal direction to circulate about an axis extending in the vertical direction at the second distal end. The second circulating unit may include a second endless member looped along the second side peripheral surface of the second arm.

In this structure, an acceleration force and a deceleration force for changing the posture of the conveyed article can be appropriately applied to the conveyed article from the first endless member and the second endless member. This structure is less likely to have a gap in which a part of the conveyed article (e.g., an accessory such as a tag) can be caught in a portion of the first arm in contact with the conveyed article or in a portion of the second arm in contact with the conveyed article, compared with a structure including multiple conveyor rollers in place of the endless members.

The first arm may have a first distal end being an end downstream in the transport direction from a portion in which the first swing axis is located. The first adjuster may include a first circulating unit located on a first side peripheral surface being a surface of the first arm facing in a horizontal direction to circulate about an axis extending in the vertical direction at the first distal end. The first arm in a posture parallel to the transport direction may be in a first reference posture. The first circulating unit in the first reference posture may circulate at a circulating speed corresponding to a first target speed. The circulating speed may be a first reference posture target speed. The first adjuster may increase, even when the first target speed remains unchanged, the circulating speed of the first circulating unit from the first reference posture target speed in response to the swing angle of the first arm increasing from when the first arm is in the first reference posture. The second arm may have a second distal end being an end downstream in the transport direction from a portion in which the second swing axis is located. The second adjuster may include a second circulating unit located on a second side peripheral surface being a surface of the second arm facing in the horizontal direction to circulate about an axis extending in the vertical direction at the second distal end. The second arm in a posture parallel to the transport direction may be in a second reference posture. The second circulating unit in the second reference posture may circulate at a circulating speed corresponding to a second target speed. The circulating speed may be a second reference posture target speed. The second adjuster may increase, even when the second target speed remains unchanged, the circulating speed of the second circulating unit from the second reference posture target speed in response to the swing angle of the second arm increasing from when the second arm is in the second reference posture.

In this structure, the circulating speed of the first circulating unit can be changed based on the swing angle of the first arm to cause the movement speed of the first circulating unit in a direction parallel to the transport direction to be close to the first target speed, and the circulating speed of the second circulating unit can be changed based on the swing angle of the second arm to cause the movement speed of the second circulating unit in the direction parallel to the transport direction to be close to the second target speed. Thus, a force corresponding to the first target speed and a force corresponding to the second target speed can be applied to the conveyed article independently of the swing angles of the first arm and the second arm. The posture of the conveyed article can thus be easily changed as appropriate for the target.

The conveyed article posture adjustment device may further include a detector that detects a posture of the conveyed article on the placement surface. The controller may determine a rotation direction in which the conveyed article is rotated in a plan view based on the posture of the conveyed article detected by the detector, and perform the first control or the second control based on the determined rotation direction.

In this structure, the rotation direction for the conveyed article to have proper posture can be determined based on the actual posture of the conveyed article, thus allowing the posture of the conveyed article to be adjusted appropriately.

The conveyed article posture adjustment device may further include a detector that detects a posture of the conveyed article on the placement surface. In the first control and the second control, the controller may perform first swing control to control the swing angle of the first arm to place the first arm in a first target posture, and second swing control to control the swing angle of the second arm to place the second arm in a second target posture. The controller may determine which of the first arm in the first target posture or the second arm in the second target posture comes in contact with the conveyed article first based on a detection result of the posture of the conveyed article from the detector. When the first arm in the first target posture is determined to come in contact with the conveyed article first, the controller may start the first swing control before the second swing control. When the second arm in the second target posture is determined to come in contact with the conveyed article first, the controller may start the second swing control before the first swing control.

One of the first adjuster or the second adjuster is controlled to apply an acceleration force to the conveyed article and the other of the first adjuster or the second adjuster is controlled to apply a deceleration force to the conveyed article. When the first swing control and the second swing control are started at the same time, a conveyed article in some posture may be, for example, caught between the first arm and the second arm, and may not be transported downstream from the first arm and the second arm in the transport direction. In contrast, in the structure described above, one of the first swing control or the second swing control is started first, thus reducing the likelihood of occurrence of the above situation. The other swing control is also started later, thus allowing the posture of the conveyed article to be adjusted using both the first arm and the second arm.

In this structure, the determination is performed as to which of the first arm or the second arm comes in contact with the conveyed article first based on the actual posture of the conveyed article. When the first arm is determined to come in contact with the conveyed article first, the first swing control is started before the second swing control. When the second arm is determined to come in contact with the conveyed article first, the second swing control is started before the first swing control. The first swing control and the second swing control can thus be started at staggered times to allow the arm that is to come in contact with the conveyed article first of the first arm and the second arm to come in contact with the conveyed article first.

The conveyed article posture adjustment device may further include a detector that detects a posture of the conveyed article on the placement surface. In the first control and the second control, the controller may control the swing angle of the first arm to be a first target swing angle and control the swing angle of the second arm to be a second target swing angle. The controller may set the first target swing angle and the second target swing angle to cause each of the first arm and the second arm to come in contact with the conveyed article based on a detection result of the posture of the conveyed article from the detector.

In this structure, the first target swing angle and the second target swing angle can be set to cause each of the first arm and the second arm to come in contact with the conveyed article based on the actual posture of the conveyed article, thus allowing the posture of the conveyed article to be adjusted appropriately.

The first arm may have a first distal end being an end downstream in the transport direction from a portion in which the first swing axis is located. The first adjuster may include a first circulating unit located on a first side peripheral surface being a surface of the first arm facing in a horizontal direction to circulate about an axis extending in the vertical direction at the first distal end. The second arm may have a second distal end being an end downstream in the transport direction from a portion in which the second swing axis is located. The second adjuster may include a second circulating unit located on a second side peripheral surface being a surface of the second arm facing in the horizontal direction to circulate about an axis extending in the vertical direction at the second distal end. The conveyed article posture adjustment device may further include a detector that detects a posture of the conveyed article on the placement surface. The controller may set a target rotation amount for the conveyed article in the first control or the second control based on a detection result of the posture of the conveyed article from the detector, and control, based on the target rotation amount, a difference in circulating speed between the first circulating unit and the second circulating unit in the first control or the second control.

In this structure, the target rotation amount for the conveyed article to have the proper posture can be set based on the actual posture of the conveyed article. The first circulating unit and the second circulating unit can be controlled to have the difference in circulating speed based on the target rotation amount, thus allowing the posture of the conveyed article to be adjusted appropriately.

The conveyed article posture adjustment device may further include a third adjustment device and a fourth adjustment device. The third adjustment device may include a third arm located above the placement surface, downstream from the first swing axis in the transport direction, and on the left to the transportation center line in the width direction, a third swing unit that swings the third arm about a third swing axis extending in the vertical direction, and a third adjuster supported by the third arm to apply a force to the conveyed article in contact with the third arm. The fourth adjustment device may include a fourth arm located above the placement surface, downstream from the second swing axis in the transport direction, and on the right to the transportation center line in the width direction, a fourth swing unit that swings the fourth arm about a fourth swing axis extending in the vertical direction, and a fourth adjuster supported by the fourth arm to apply a force to the conveyed article in contact with the fourth arm. The controller may perform third control, in addition to the first control, to rotate the conveyed article clockwise in a plan view and perform the third control, in addition to the second control, to rotate the conveyed article counterclockwise in a plan view. In the third control, the controller may control a swing angle of the third arm to cause the third arm to come in contact with the conveyed article and control a swing angle of the fourth arm to cause the fourth arm to come in contact with the conveyed article. The controller may set an inclination angle of the third arm with respect to the transport direction in the third control to be greater than an inclination angle of the first arm with respect to the transport direction in the first control and the second control, and set an inclination angle of the fourth arm with respect to the transport direction in the third control to be greater than an inclination angle of the second arm with respect to the transport direction in the first control and the second control.

In this structure, the posture of the conveyed article that has been changed using the first arm and the second arm can be further changed using the third arm and the fourth arm located on both sides of the transportation center line in the width direction. The inclination angle of the third arm in the third control is set greater than the inclination angle of the first arm in the first control and the second control, and the inclination angle of the fourth arm in the third control is set greater than the inclination angle of the second arm in the first control and the second control. This allows the distance between the distal end of the third arm and the distal end of the fourth arm in the third control to be narrower than the distance between the distal end of the first arm and the distal end of the second arm in the first control and the second control. This allows the posture of the conveyed article to be easily adjusted appropriately by, for example, roughly adjusting the posture of the conveyed article in the first control or the second control and then finely adjusting the posture of the conveyed article in the third control.

The conveyed article posture adjustment device may further include a detector that detects a posture of the conveyed article on the placement surface. In the first control and the second control, the controller may perform first swing control to control the swing angle of the first arm to place the first arm in a first target posture, and second swing control to control the swing angle of the second arm to place the second arm in a second target posture. In the third control, the controller may perform third swing control to control the swing angle of the third arm to place the third arm in a third target posture, and fourth swing control to control the swing angle of the fourth arm to place the fourth arm in a fourth target posture. The controller may determine which of the first arm in the first target posture or the second arm in the second target posture comes in contact with the conveyed article first based on a detection result of the posture of the conveyed article from the detector. When the first arm in the first target posture is determined to come in contact with the conveyed article first, the controller may start the first swing control before the second swing control and the third swing control before the fourth swing control. When the second arm in the second target posture is determined to come in contact with the conveyed article first, the controller may start the second swing control before the first swing control and the fourth swing control before the third swing control.

In this structure, either the first swing control or the second swing control is started first, thus reducing the likelihood of occurrence of the above situation (more specifically, a situation in which the conveyed article is, for example, caught between the first arm and the second arm and cannot be transported downstream from the first arm and the second arm in the transport direction), and either the third swing control or the fourth swing control is started first, thus reducing the likelihood of occurrence of a similar situation (more specifically, a situation in which the conveyed article is, for example, caught between the third arm and the fourth arm and cannot be transported downstream from the third arm and the fourth arm in the transport direction).

In this structure, the determination is performed as to which of the first arm or the second arm comes in contact with the conveyed article first based on the actual posture of the conveyed article. When the first arm is determined to come in contact with the conveyed article first, the first swing control is started before the second swing control. When the second arm is determined to come in contact with the conveyed article first, the second swing control is started before the first swing control. The first swing control and the second swing control can thus be started at staggered times to allow the arm that is to come in contact with the conveyed article first of the first arm and the second arm to come in contact with the conveyed article first.

When the first arm of the first arm and the second arm comes in contact with the conveyed article first, the third arm of the third arm and the fourth arm is more likely to come in contact with the conveyed article first. When the second arm of the first arm and the second arm comes in contact with the conveyed article first, the fourth arm of the third arm and the fourth arm is more likely to come in contact with the conveyed article first. In this structure, when the first arm is determined to come in contact with the conveyed article first, the third swing control is started before the fourth swing control, and when the second arm is determined to come in contact with the conveyed article first, the fourth swing control is started before the third swing control. In the above situation, the third swing control and the fourth swing control can be started at staggered times to allow the arm that is more likely to come in contact with the conveyed article first of the third arm and the fourth arm to come in contact with the conveyed article first.

When no conveyed article is transported downstream from the first arm and the second arm in the transport direction after a predetermined time elapses from when the first control or the second control is started, the controller may end the first control or the second control being performed and control the swing angle of the first arm to cause the first target area in the first arm to move away from the conveyed article and the swing angle of the second arm to cause the second target area in the second arm to move away from the conveyed article.

In this structure, when the conveyed article is, for example, caught between the first arm and the second arm and cannot be transported downstream from the first arm and the second arm in the transport direction, the first control or the second control being performed is ended after the predetermined time elapses from the start of the first control or the second control, and the first arm and the second arm can be moved away from the conveyed article. The conveyed article released from the first arm and the second arm in this manner can thus be, for example, transported downstream in the transport direction to undergo another control (e.g., the third control described above) or abnormality response operation (e.g., change of the posture by an operator).

The conveyed article posture adjustment device according to one or more embodiments of the disclosure may produce at least one of the effects described above.

REFERENCE SIGNS LIST

1 Conveyed article posture adjustment device
2 Conveyed article
3 Controller
10 First adjustment device
11 First arm
**11*b*** First distal end
12 First side peripheral surface
13 First swing unit
15 First adjuster
16 First circulating unit
**16*a*** First endless member
20 Second adjustment device
21 Second arm
**21*b*** Second distal end
22 Second side peripheral surface
23 Second swing unit
25 Second adjuster
26 Second circulating unit
**26*a*** Second endless member
30 Third adjustment device
31 Third arm
33 Third swing unit
35 Third adjuster
40 Fourth adjustment device
41 Fourth arm
43 Fourth swing unit
45 Fourth adjuster
60 Detector
90 Conveyor
**90*a*** placement surface
A1 First swing axis
A2 Second swing axis
A3 Third swing axis
A4 Fourth swing axis
C Transportation center line
P1 First reference posture
P2 Second reference posture
Q1 First target posture
Q2 Second target posture
Q3 Third target posture
Q4 Fourth target posture
T Transport direction
T1 upstream end in transport direction
T2 downstream end in transport direction
V1 First circulating speed (circulating speed of first circulating unit)
V2 Second circulating speed (circulating speed of second circulating unit)
W Width direction
WL Left in width direction
WR Right in width direction
Z Vertical direction
Z1 Upper area
θ Swing angle

The invention claimed is:

1. A conveyed article posture adjustment device for a conveyor to transport, in a predetermined transport direction, a conveyed article on a placement surface from upstream to downstream in the transport direction, the device comprising:

a first adjustment device;

a second adjustment device; and a controller, and wherein:

the first adjustment device comprises:

a first arm located above the placement surface and on a left to a transportation center line in a width direction perpendicular to the transport direction as viewed in a vertical direction, the left in the width direction is a left as viewed downstream in the transport direction, the transportation center line is an imaginary line passing through a center portion of the placement surface in the width direction and extending in the transport direction, a first swing unit configured to swing the first arm about a first swing axis extending in the vertical direction, and a first adjuster supported by the first arm to apply a force to the conveyed article in contact with the first arm, the second adjustment device comprises:

a second arm located above the placement surface and on a right to the transportation center line in the width direction, the right in the width direction is a right as viewed downstream in the transport direction, a second swing unit configured to swing the second arm about a second swing axis extending in the vertical direction, and a second adjuster supported by the second arm to apply a force to the conveyed article in contact with the second arm, the controller is configured to perform first control to rotate the conveyed article clockwise in a plan view and perform second control to rotate the conveyed article counterclockwise in a plan view, in the first control, the controller being configured to control a swing angle of the first arm to cause the first arm to come in contact with the conveyed article, control a swing angle of the second arm to cause the second arm to come in contact with the conveyed article, control the first adjuster to apply an acceleration force to the conveyed article, and control the second adjuster to apply a deceleration force to the conveyed article, in the second control, the controller is configured to control the swing angle of the first arm to cause the first arm to come in contact with the conveyed article, control the swing angle of the second arm to cause the second arm to come in contact with the conveyed article, control the first adjuster to apply a deceleration force to the conveyed article, and control the second adjuster to apply an acceleration force to the conveyed article.

2. The conveyed article posture adjustment device according to claim 1, wherein the first arm has a first distal end that is an end downstream in the transport direction from a portion in which the first swing axis is located, the first adjuster comprises a first circulating unit located on a first side peripheral surface that is a surface of the first arm facing in a horizontal direction to circulate about an axis extending in the vertical direction at the first distal end, the first circulating unit comprises a first endless member looped along the first side peripheral surface of the first arm, the second arm has a second distal end that is an end downstream in the transport direction from a portion in which the second swing axis is located, the second adjuster comprises a second circulating unit located on a second side peripheral surface that is a surface of the second arm facing in the horizontal direction to circulate about an axis extending in the vertical direction at the second distal end, and the second circulating unit comprises a second endless member looped along the second side peripheral surface of the second arm.

3. The conveyed article posture adjustment device according to claim 1, wherein the first arm has a first distal end that is an end downstream in the transport direction from a portion in which the first swing axis is located, the first adjuster comprises a first circulating unit located on a first side peripheral surface that is a surface of the first arm facing in a horizontal direction to circulate about an axis extending in the vertical direction at the first distal end, the first arm in a posture parallel to the transport direction is in a first reference posture, the first circulating unit in the first reference posture circulates at a circulating speed corresponding to a first target speed, and the circulating speed is a first reference posture target speed, the first adjuster increases, even when the first target speed remains unchanged, the circulating speed of the first circulating unit from the first reference posture target speed in response to the swing angle of the first arm increasing from when the first arm is in the first reference posture, the second arm has a second distal end that is an end downstream in the transport direction from a portion in which the second swing axis is located, the second adjuster comprises a second circulating unit located on a second side peripheral surface that is a surface of the second arm facing in the horizontal direction to circulate about an axis extending in the vertical direction at the second distal end, the second arm in a posture parallel to the transport direction is in a second reference posture, the second circulating unit in the second reference posture circulates at a circulating speed corresponding to a second target speed, and the circulating speed is a second reference posture target speed, and the second adjuster increases, even when the second target speed remains unchanged, the circulating speed of the second circulating unit from the second reference posture target speed in response to the swing angle of the second arm increasing from when the second arm is in the second reference posture.

4. The conveyed article posture adjustment device according to claim 1, further comprising:

a detector configured to detect a posture of the conveyed article on the placement surface, and wherein the controller determines a rotation direction in which the conveyed article is rotated in a plan view based on the posture of the conveyed article detected by the detector, and performs the first control or the second control based on the determined rotation direction.

5. The conveyed article posture adjustment device according to claim 1, further comprising:

a detector configured to detect a posture of the conveyed article on the placement surface, and wherein, in the first control and the second control, the controller performs first swing control to control the swing angle of the first arm to place the first arm in a first target posture, and second swing control to control the swing angle of the second arm to place the second arm in a second target posture, the controller determines which of the first arm in the first target posture or the second arm in the second target posture comes in contact with the conveyed article first based on a detection result of the posture of the conveyed article from the detector, when the first arm in the first target posture is determined to come in contact with the conveyed article first, the controller starts the first swing control before the second swing control, and when the second arm in the second target posture is determined to come in contact with the conveyed article first, the controller starts the second swing control before the first swing control.

6. The conveyed article posture adjustment device according to claim 1, further comprising:

a detector configured to detect a posture of the conveyed article on the placement surface, and wherein: in the first control and the second control, the controller controls the swing angle of the first arm to be a first target swing angle and controls the swing angle of the second arm to be a second target swing angle, and the controller sets the first target swing angle and the second target swing angle to cause each of the first arm and the second arm to come in contact with the conveyed article based on a detection result of the posture of the conveyed article from the detector.

7. The conveyed article posture adjustment device according to claim 1, wherein the first arm has a first distal end that is an end downstream in the transport direction from a portion in which the first swing axis is located, the first adjuster comprises a first circulating unit located on a first side peripheral surface that is a surface of the first arm facing in a horizontal direction to circulate about an axis extending in the vertical direction at the first distal end, the second arm has a second distal end that is an end downstream in the transport direction from a portion in which the second swing axis is located, the second adjuster comprises a second circulating unit located on a second side peripheral surface that is a surface of the second arm facing in the horizontal direction to circulate about an axis extending in the vertical direction at the second distal end, the conveyed article posture adjustment device further comprises a detector configured to detect a posture of the conveyed article on the placement surface, and the controller sets a target rotation amount for the conveyed article in the first control or the second control based on a detection result of the posture of the conveyed article from the detector, and controls, based on the target rotation amount, a difference in circulating speed between the first circulating unit and the second circulating unit in the first control or the second control.

8. The conveyed article posture adjustment device according to claim 1, further comprising:

a third adjustment device; and a fourth adjustment device, and wherein:the third adjustment device comprises:

a third arm located above the placement surface, downstream from the first swing axis in the transport direction, and on the left to the transportation center line in the width direction, a third swing unit configured to swing the third arm about a third swing axis extending in the vertical direction, and a third adjuster supported by the third arm to apply a force to the conveyed article in contact with the third arm, the fourth adjustment device comprises:

a fourth arm located above the placement surface, downstream from the second swing axis in the transport direction, and on the right to the transportation center line in the width direction, a fourth swing unit configured to swing the fourth arm about a fourth swing axis extending in the vertical direction, and a fourth adjuster supported by the fourth arm to apply a force to the conveyed article in contact with the fourth arm, the controller performs third control, in addition to the first control, to rotate the conveyed article clockwise in a plan view and performs the third control, in addition to the second control, to rotate the conveyed article counterclockwise in a plan view, in the third control, the controller controls a swing angle of the third arm to cause the third arm to come in contact with the conveyed article and controls a swing angle of the fourth arm to cause the fourth arm to come in contact with the conveyed article, and the controller sets an inclination angle of the third arm with respect to the transport direction in the third control to be greater than an inclination angle of the first arm with respect to the transport direction in the first control and the second control, and sets an inclination angle of the fourth arm with respect to the transport direction in the third control to be greater than an inclination angle of the second arm with respect to the transport direction in the first control and the second control.

9. The conveyed article posture adjustment device according to claim 8, further comprising:

a detector configured to detect a posture of the conveyed article on the placement surface, and wherein:

in the first control and the second control, the controller performs first swing control to control the swing angle of the first arm to place the first arm in a first target posture, and second swing control to control the swing angle of the second arm to place the second arm in a second target posture, in the third control, the controller performs third swing control to control the swing angle of the third arm to place the third arm in a third target posture, and fourth swing control to control the swing angle of the fourth arm to place the fourth arm in a fourth target posture, the controller determines which of the first arm in the first target posture or the second arm in the second target posture comes in contact with the conveyed article first based on a detection result of the posture of the conveyed article from the detector, when the first arm in the first target posture is determined to come in contact with the conveyed article first, the controller starts the first swing control before the second swing control and the third swing control before the fourth swing control, and when the second arm in the second target posture is determined to come in contact with the conveyed article first, the controller starts the second swing control before the first swing control and the fourth swing control before the third swing control.

10. The conveyed article posture adjustment device according to claim 1, wherein when no conveyed article is transported downstream from the first arm and the second arm in the transport direction after a predetermined time elapses from when the first control or the second control is started, the controller ends the first control or the second control being performed and controls the swing angle of the first arm to cause the first arm to move away from the conveyed article and the swing angle of the second arm to cause the second arm to move away from the conveyed article.

* * * * *